United States Patent [19]

Ridge et al.

[11] 4,393,410
[45] Jul. 12, 1983

[54] MULTIPLE CAMERA AUTOMATIC DIGITIZER AND METHOD

[75] Inventors: Warren J. Ridge; Dennis C. Roberts, both of Scottsdale, Ariz.

[73] Assignee: Wespac, San Diego, Calif.

[21] Appl. No.: 321,233

[22] Filed: Nov. 13, 1981

[51] Int. Cl.³ .............................................. H04N 1/10
[52] U.S. Cl. .................................... 358/285; 358/293; 358/294
[58] Field of Search .................... 358/87, 93, 285, 293, 358/294

[56] References Cited

U.S. PATENT DOCUMENTS 4,092,632 5/1978 Agulnek .............................. 358/294
4,356,513 10/1982 Yoshimura et al. ................ 358/293
4,358,794 11/1982 Kurakami et al. .................. 358/293

Primary Examiner—Joseph A. Orsino, Jr.
Attorney, Agent, or Firm—Cahill, Sutton & Thomas

[57] ABSTRACT

A multiple camera automatic digitizer includes a plurality of spaced video cameras mounted within a housing under a transparent digitizing surface. Multiplexing circuitry multiplexes video signals from a selected video camera into a video amplifier, the output of which is converted to a digital number representing the darkness of the point of the document most recently scanned by a presently selected one of the video cameras. In accordance with the invention, the automatic digitizer includes a microprocessor, system controls that allows selection of various ones of the video cameras to achieve digitizing of corresponding areas of a large document, and computes skew correction factors for each camera as the basis of digitizing of a plurality of permanent alignment marks on a bottom surface of a cover for the digitizing surface. The skew correction factors are used to skew correct the camera data produced by the corresponding camera. The skew corrected lateral offset of each camera is computed by the microprocessor on the basis of the digitized coordinates of the alignment points and is used to automatically compute skew corrected, offset corrected document coordinates for all of the video cameras.

32 Claims, 20 Drawing Figures

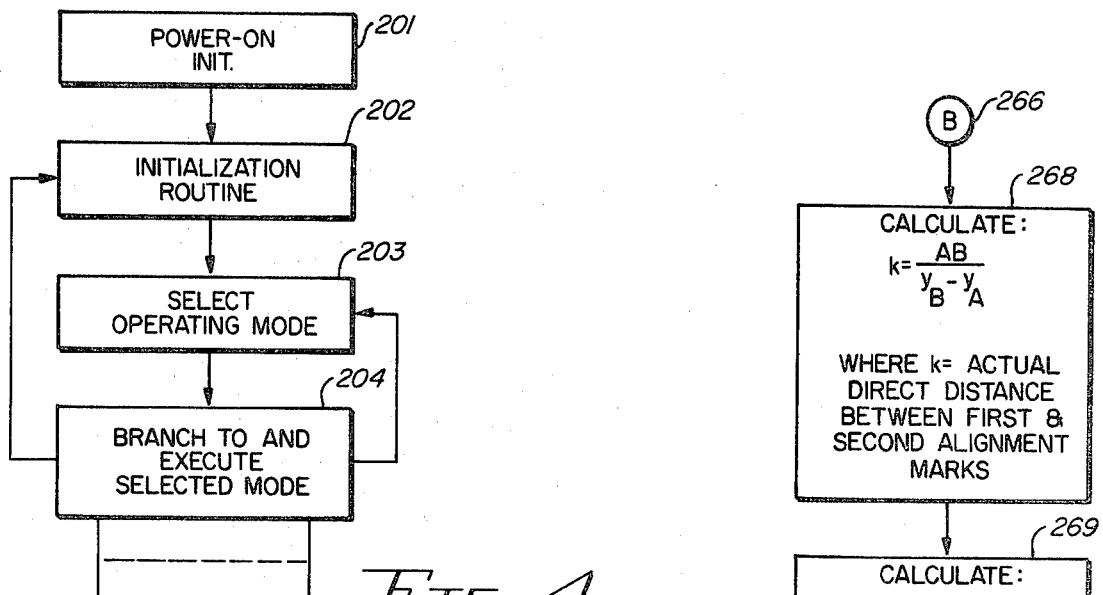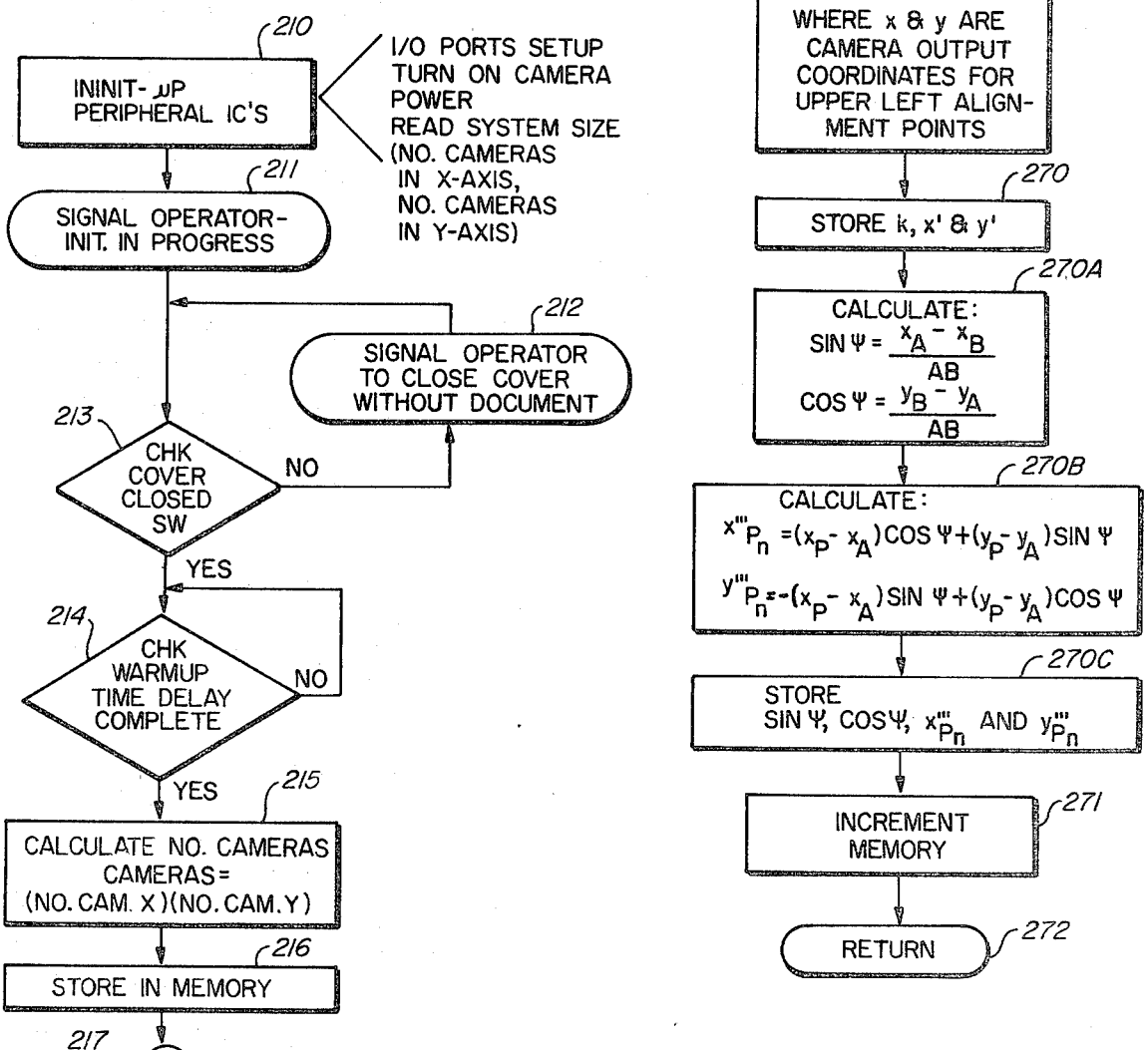

MULTIPLE CAMERA AUTOMATIC DIGITIZER AND METHOD

BACKGROUND OF THE INVENTION

The invention relates to low cost, automatic digitizers and methods for rapidly digitizing documents, and particularly to devices and methods utilizing multiple video cameras to achieve rapid automatic digitizing of large documents that extend beyond the field of view of a single video camera.

Various types of digitizers, including manual digitizers, are well known. Manual digitizers are widely used for low cost digitizing applications. Manual digitizers are those that require manual control of the positioning of a cursor or electronic pen or the like on a digitizing surface adjacent to a desired point of a document. Manual digitizers convert the coordinates of the desired point to digital numbers, either in response to a "digitize command" or continuously, as an electronic pen or cursor is positioned at a point of, or is removed along a line of, the document. Manual digitizers require the full-time attention of an operator to position the electronic pen or cursor. The accuracy of various types of manual digitizers usually is very sensitive to the presence of metallic or magnetic substances on or near the digitizing surface of the document to be digitized, to thermal expansion of substances in which grid conductors of a digitizing surface are embedded, and to the amount of tilt of the electronic pen. Manual digitizers are quite slow, due to the necessity of manually moving the cursor. For example, using a typical manual digitizer, a skilled operator may require approximately eight hours to digitize a 40-inch by 60-inch document, 20 percent of the area of which is covered by lines that are to be digitized.

Some present automatic digitizers, i.e., those that do not require an operator to position a cursor or electronic pen for each point or line digitized, use a video camera to scan a document area within the field of view of the video camera. Such automatic digitizing devices are extremely expensive, and their utilization has been limited to applications in which there has been crucial need for high speed digitizing of entire documents, such as satellite weather photos, medical X-ray photos, and the like. The high cost of automatic digitizers has been due to the fact that high resolution state-of-the-art video cameras are very expensive and a great deal of high speed data processing capability and memory storage capability is required to achieve automatic digitizing with high resolution. The required level of data processing capability and speed has been roughly equal to that of, for example, a PDP11 minicomputer made by Digital Equipment Corporation, or equivalent machines. Due to the high cost of automatic digitizing machines, they have not been developed for competition in the markets presently dominated by manual digitizers. Another reason, in addition to their high cost, that automatic digitizers have not been able to compete in the marketplace with manual digitizers is that "smart" manual digitizers are readily available at substantially lower cost. "Smart" digitizers are those that can "interface" with computers to provide "menu selection" of complex stored shapes (such as alpha-numerics) that can be almost instantly selected from a "menu" by appropriate positioning of a cursor or electronic pen and keyboard entry of commands calling up a selected shape that is stored in digitized form in the computer, although such stored shapes would be very time-consuming to digitize by manual positioning of a cursor or electronic pen. The availability of smart digitizers with this type of menu selection capability, and the exceedingly high cost of automatic digitizers, has caused it impractical to attempt to develop low cost automatic digitizing machines that would compete "head on" in the markets with manual digitizers. Furthermore, the limited field of view of the state-of-the-art video cameras and the need for certain minimum levels of resolution has led to the requirement that video cameras of present automatic digitizing devices be located relatively close to the document surface, preventing digitizing of large documents.

However, if automatic digitizers could be constructed inexpensively, the fact that they are capable of automatic operation without the cost of a human operator, the fact that they are extremely fast, and the fact that they are capable of digitizing not only point and line coordinates, but also degrees of darkness, suggest that automatic digitizers would be readily accepted if they could be provided inexpensively and with the capability of providing satisfactory resolution while digitizing large documents (as large or larger than the sizes that can be digitized by presently available manual digitizers).

Accordingly, it is an object of this invention to provide an automatic digitizing machine and method capable of high speed, accurate, high resolution automatic digitizing of position coordinates of points of large documents or items, at a cost that is competitive with the costs of presently known manual digitizers.

It is another object of the invention to provide a digitizing device and method that allows rapid, accurate digitizing of large documents utilizing a plurality of video cameras or other array type image sensor devices.

SUMMARY OF THE INVENTION

Briefly described, and in accordance with one embodiment thereof, the invention provides an automatic digitizer including a plurality of video cameras within a housing and adjacent to a transparent plate having an outer digitizing surface and continuous overlapping areas within the fields of view of the respective video cameras; a removable reference surface having a plurality of permanent; aligned alignment marks thereon for placement against the digitizing surface for effecting initializing of the automatic digitizer to effectuate skew correction and offset correction of coordinate data produced by each of the video cameras; circuitry for converting analog video signals produced by the respective video cameras to corresponding digital numbers representing the relative darkness of the most recently scanned point of a document or item being digitized; and circuitry for effecting initial digitizing of the coordinates of the alignment marks on the reference surface and using information based on those coordinates to compute skew corrected, offset corrected document coordinates corresponding to each pair of camera coordinates produced by each of the video cameras. In the described embodiment of the invention, multiplexer circuits couple the video outputs of the respective video cameras to the input of a video amplifier and to a cursor injection circuit. The output of the cursor injection circuit is coupled to a video monitor that displays the portion of a document that is within the field of view of the presently selected camera.

A cursor image is displayed on the video monitor screen and is superimposed on the portion of the document displayed on the screen. The position of the cursor (in one embodiment of the invention) is determined by the position of a joystick. Circuitry responsive to the position of the joystick produces digital signals representing the position of the joystick to an input of the cursor injection circuit. Digital information produced by the presently selected camera is used to increment a horizontal position counter and a vertical position counter, the outputs of which are coupled to respective ones of a first set of compare inputs of a digital comparator. The corresponding ones of a second set of comparison inputs of the digital comparator are connected to the respective terminals of an output port of a microprocessor system that produces, at that output port, logic levels representing the coordinates of the point to be digitized next. When the contents of the horizontal and vertical position counter match the coordinates of the next point to be digitized, the digital comparator produces a convert command. An analog-to-digital converter has its analog input coupled to receive the video signal being produced by the presently selected camera, and converts the amplitude of that video signal to a digital representation of the relative darkness of the selected point of the document in response to the convert command.

The microprocessor system operates on that digitized number, which is a camera coordinate of the field of view of the presently selected camera, to produce a document coordinate that is corrected for the skew and offset between the coordinate axes of the field of view of the selected camera and a document being digitized. To this end, the microprocessor system executes an initialization process wherein for each camera, the alignment marks on the alignment surface are digitized. From this information, correction constants are computed for that camera for the alignment points in the field of view of that camera. The skew corrected coordinates of the alignment points are used to obtain skew and offset corrected constants that are algebraically added to the skew corrected camera coordinates to produce skew corrected, offset corrected document coordinates that are uniformly spaced and aligned along transitions from the field of view of one camera to the field of view of an adjacent camera.

In the described embodiment of the invention, the microprocessor performs a "dark check" operation to determine the relative light level under "no internal light" conditions seen by one of the cameras when the digitizing surface is completely covered by a lightproof cover. The zero reference adjustment input of the analog-to-digital converter is repeatedly adjusted for each of the other cameras until the output of the analog to digital converter is the same as for the first camera. Zero adjust constants are stored within the microprocessor system memory and are recalled and used to set the zero reference input of the analog-to-digital converter each time the corresponding cameras are respectively selected. The microprocessor performs a light check operation to obtain and store gain adjust constants that are recalled and used to set the gain adjust input of the analog to digital converter each time the corresponding camera is selected.

BRIEF DESCRIPTION OF THE DRAWINGS

FIG. 4 is a flow chart illustrating the basic operation of the microprocessor system contained in the circuits of FIGS. 3A and 3B.

FIGS. 4A-4G constitute a flow chart of firmware executed by the microprocessor and contained in the circuits of FIGS. 3A and 3B in accordance with the present invention.

DESCRIPTION OF THE INVENTION

Figure 1:
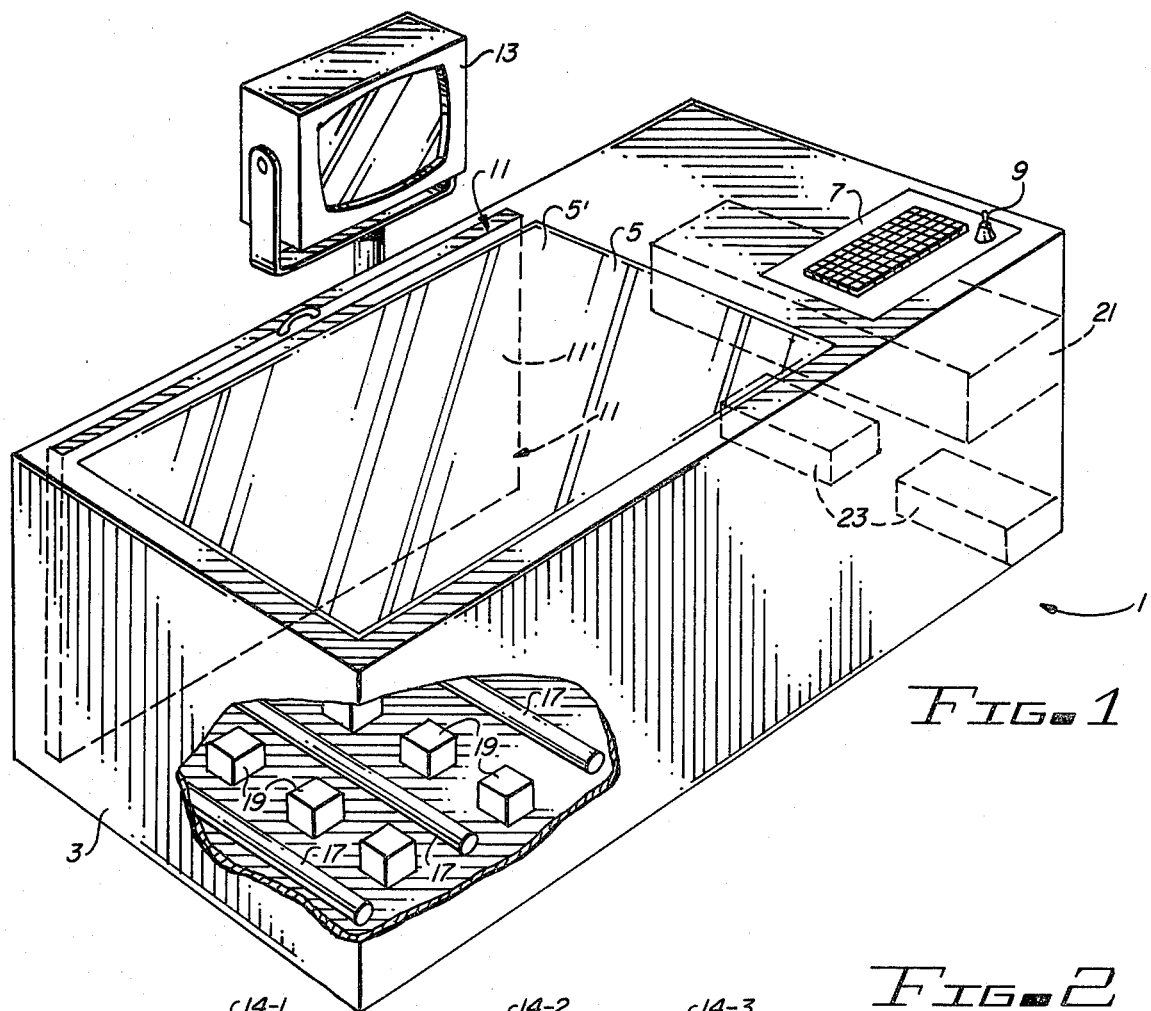
FIG. 1 is a partial cutaway perspective view illustrating the automatic digitizer of the present invention.

Referring to FIG. 1, automatic digitizer 1 includes a housing 3 that supports the transparent plate 5, the upper surface of 5′ of which is referred to as the "digitizing surface". In operation, a document to be digitized is placed face down on digitizing surface 5′. A flexible cover 11 has a white bottom surface 11′, shown in FIG. 2, which has a number of spaced alignment points P1, P2 . . . P20 thereon, as subsequently explained. Cover 11 can be withdrawn from storage slot 12 and placed so that surface 11′ is directly against digitizing surface 5′ to effect an initialization process that is subsequently described herein, or cover 11 can be placed on top of a document to hold the document flat against digitizing surface 5′.

A plurality of spaced video cameras 19 arranged in rows are disposed within housing 3 below digitizing surface 5′. A plurality of "light bars" 17 are also disposed between rows of video cameras 19 to provide controlled illumination of the surface to be digitized. Light emitted from light bars 17 passes through transparent plate 5 and digitizing surface 5′ to the surface of the document or item to be digitized, or to the surface 11′ on which the above mentioned alignment marks are permanently disposed.

Automatic digitizer 1 includes a video display unit 13 that shows the portion of a document being presently scanned by a selected one of video cameras 19, and also displays a cursor, the position of which is manually controlled by means of joy stick 9 and/or keyboard 7. Reference numeral 21 designates the location of the electronic circuitry shown in the block diagram of FIGS. 3A and 3B; reference numeral 23 indicates the location of suitable power supplies.

Figure 2:
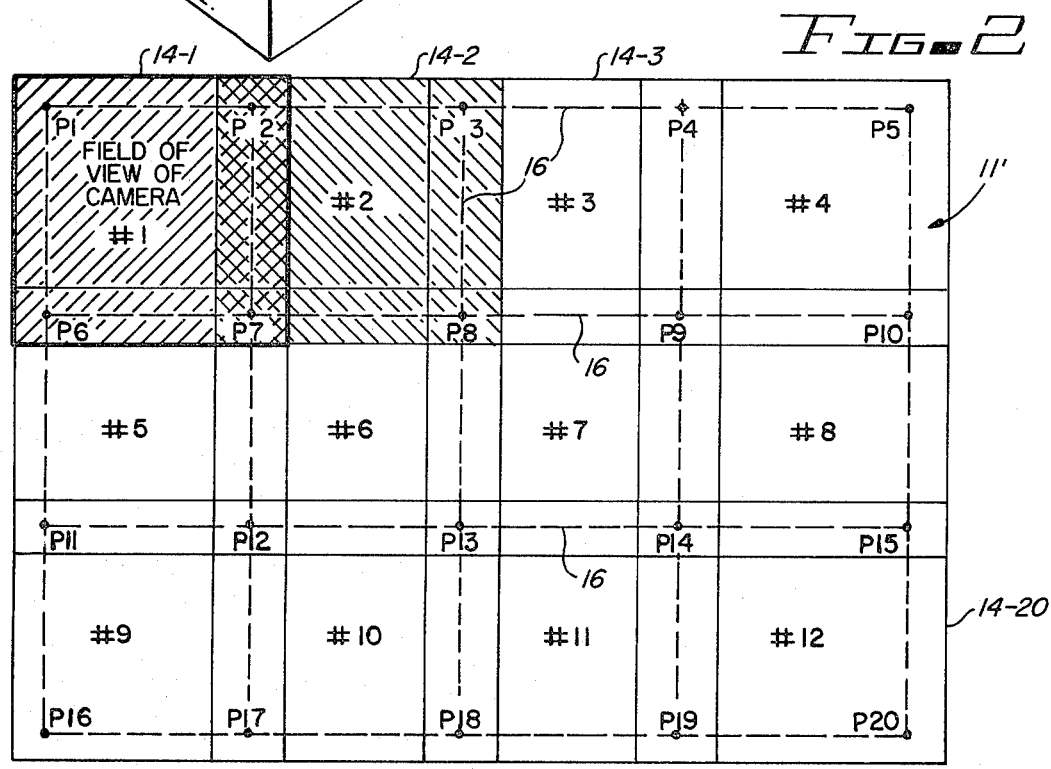
FIG. 2 is a plan view of the bottom surface of the cover of the digitizer of FIG. 1, showing alignment marks on the bottom surface and overlap regions of the fields of view of various video cameras contained in the digitizer of FIG. 1.

Overall understanding of the invention can perhaps be best understood if it is first understood that only one of video cameras 19 is scanning at a time, and it scans only that portion of the digitizing surface in its "field of view". As mentioned above, each of the cameras is rigidly mounted, and therefor scans a fixed area of the digitizing surface 5′. For the presently described embodiment of the invention, there are 12 video cameras 19. They are rigidly attached along spaced intervals so that their respective fields of view include 12 overlapping areas of digitizing surface 5'. Assume that surface 11' cover 11 is placed on digitizing surface 5'. The array of video cameras then "sees" surface 11', as shown in FIG. 2, whereon 20 of the above mentioned alignment marks P1, P2 . . . P20 are permanently marked. The fields of view of the 12 video cameras 19 are indicated in FIG. 2 by the 12 overlapping solid rectangles, such as 14-1, 14-2 . . . 14-12. The 12 areas bounded by the dotted lines represent the bounds of skew-corrected, offset corrected x and y coordinate variables obtained from the corresponding 12 video cameras 19.

It should be understood that the positioning of each of video cameras 19 is not exact. Therefore, the x and y scanning coordinate axes of each video camera are skewed relative to horizontal and vertical coordinates of surface 11.

Therefore, the automatic digitizer 1 causes each x and y "camera coordinate" digitized for each of video cameras 19 to be "skew corrected". Each of the 12 video cameras except the one whose field of view includes the area designated "Camera #1" in FIG. 2 is horizontally and/or vertically offset from Camera #1. (Hereafter, the 12 video cameras will be individually referred to as Camera No. 1, Camera No. 2, etc., in accordance with the field of view area shown in FIG. 2). Therefore, for each camera except Camera No. 1, each x or y camera coordinate digitized must also be "offset corrected" relative to Camera No. 1. The basic skew and offset correction operations will be described next.

Figure 5A:
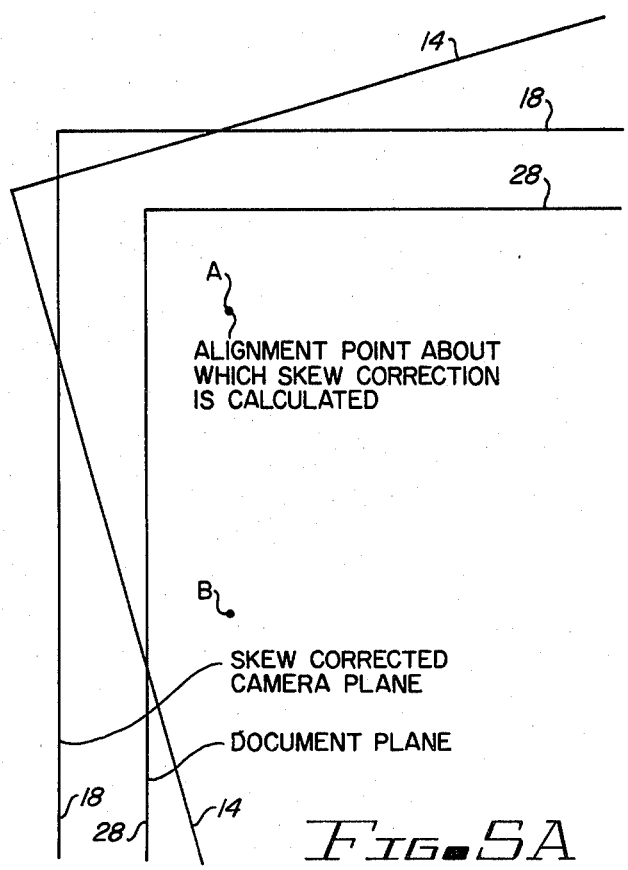
FIGS. 5A-5F are diagrams that are useful in explaining a skew correction process and an offset correction process performed by the digitizer of FIG. 1.

To this end, FIG. 5A shows a generalized portion of surface 11' that is within the field of view 14, hereinafter referred to as the "skewed camera plane", of one of video cameras 19. Points A and B in FIG. 5A can be any pair of alignment marks of surface 11', such as P2 and P7 (FIG. 2), in field of view 14 of a particular video camera.

Since points A and B are accurately marked on the test pattern surface of the underside of cover 11, the length of line AB in FIG. 5A is a known constant. Assuming a camera skew condition as shown in FIG. 5A, the camera, starting at the upper left corner of its field of view 14, scans alignment point A at camera "alignment point coordinates" $x_A$, $y_A$, and scans point B at camera coordinates $x_B$, $y_B$. It can be easily seen that the video camera having field of view 14 (also referred to as skewed camera plane 14) is skewed relative to the horizontal and vertical coordinates of surface 11', which coordinates are referred to hereinafter as "document coordinates".

As mentioned above, in FIG. 5A, reference number 14 designates the skewed document plane, as seen by the presently selected camera, which is assumed to be mounted so that its field of view is slightly skewed. Reference numeral 18 refers to the "skew corrected camera plane", which is the field of view that the selected camera would see if it is rotated so that its skew is perfectly corrected. Reference numeral 28 designates the "document plane", which is the document to be digitized. Its placement is arbitrary, but is shown as aligned with the skew corrected camera plane in FIG. 5A for convenience, because normally there will be document alignment guides that facilitate aligning of the document with the skew corrected camera plane.

Figure 5B:
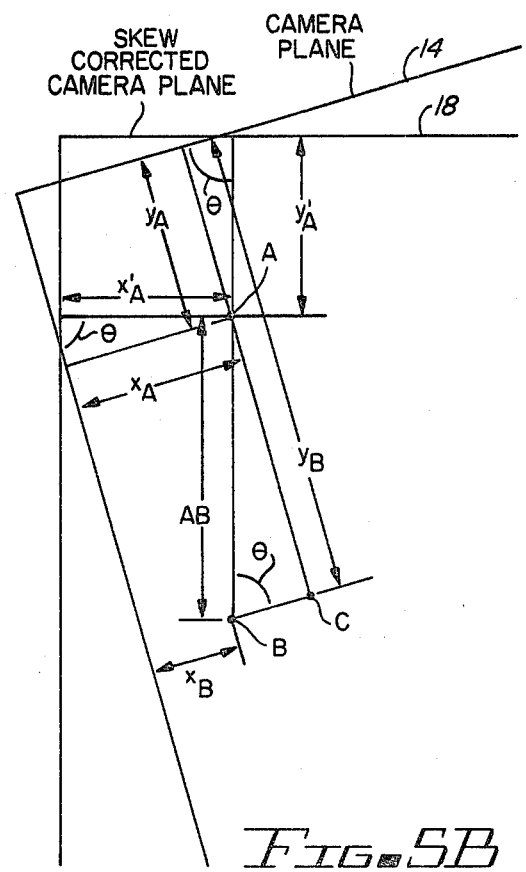

FIG. 5B shows camera plane 14 and skew corrected camera plane 18 and generalized alignment points A and B and a third point C.

By applying basic rules of trigonometry, a right triangle ABC may be formed. The angle $\theta$ is the angle between lines AB and BC. Since the hypotenuse length AB is known, and the length of side AC can be calculated by subtracting $y_A$ from $y_B$; the sine of $\theta$ is therefore:

$$\sine \theta = AC/AB$$

Now the "skew corrected document alignment point coordinates" $x'_A$, $y'_A$ values of the alignment point A can be calculated.

The camera "alignment point coordinates" $x_A$, $y_A$ and $x_B$, $y_B$ are shown in FIG. 5B. The skew corrected "alignment point" coordinates $x'_A$, $y'_B$ are also shown. A right triangle geometrically similar to triangle ABC is drawn having a hypotenuse length equal to $x'_A$ and one side equal to $x_A$. Therefore, by elementary trigonometry, $$x_A' = (AB/AC)x_A.$$

Therefore, $x'_A = kx_A$, where $k = AB/AC$.

Another right triangle geometrically similar to triangle ABC is drawn in FIG. 5B having a hypotenuse equal to $y'_A$ and one side equal to $y_A$. Therefore, $$y'_A = (AB/AC)y_A.$$

Therefore, $$y'_A = ky,$$

where $k = AB/AC$.

The relationships of the above equations hold for determining the skew corrected coordinates of any alignment point, and may be generalized as $$x'_n = kx_n \quad (1)$$

and $$y'_n = ky_n \quad (2)$$

where $k = AB/AC$ for the subject video camera, $x_n$ and $y_n$ are the camera coordinates of alignment point A, and $x'_n$ and $y'_n$ are the skew corrected camera coordinates around alignment point A.

It should be emphasized that equations (1) and (2) hold for skew correction of generalized alignment points around which the skew is to be corrected, but do not hold true for generalized points on a document to be digitized.

Figure 5C:
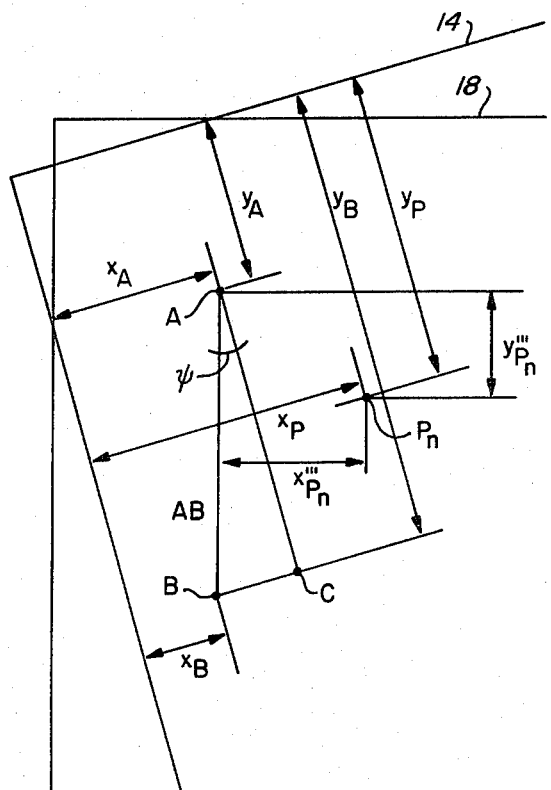

Turning now to FIG. 5C, a generalized document point Pn is shown, in addition to alignment points A and B. $\psi$ is the skew angle between the lines AB and AC. By elementary trigonometry, it can be seen that $$\sine \psi = (x_A - x_B)/AB \text{ and}$$

$$\cos \psi = (y_B - y_A)/AB.$$

Still referring to FIG. 5C, it can be proved that $$x_{Pn}''' = (x_P - x_A) \cos \psi + (y_P - y_A) \sine \psi \quad (3)$$

and $$y_{Pn}''' = -(x_P - x_A) \sine \psi + (y_P - y_A) \cos \psi \quad (4)$$

where
- $x_{Pn}'''$ is the skew corrected distance in the x direction between document point Pn and alignment point A;
- $y_{Pn}'''$ is the skew corrected distance in the y direction between document point Pn and alignment point A;
- $x_P$ and $y_P$ are the camera coordinates of the document point Pn;
- $x_A$ and $y_A$ are the camera coordinates of alignment point A; and
- $x_B$ and $y_B$ are the camera coordinates of alignment point B.

Thus, equations (3) and (4) can be used to obtain the coordinates, relative to alignment point A, of any generalized document point Pn within the selected camera's field of view.

Figure 5D:
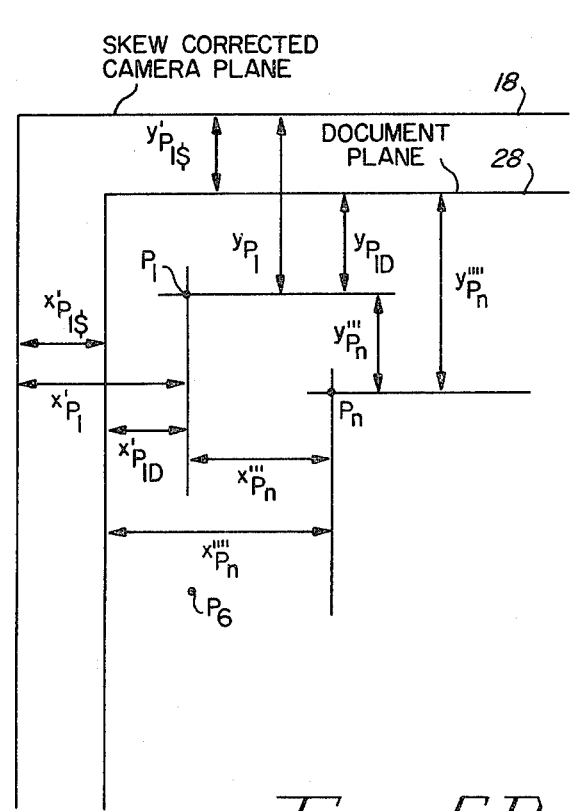

FIG. 5D shows the skew corrected camera plane 18 and the above-mentioned document plane 28 for Camera No. 1. At this time, it is convenient to identify the specific alignment points P1 and P6 used in FIG. 2, rather than the generalized alignment points A and B of FIGS. 5A-C. Pn is a generalized document point in document plane 28. In FIG. 5D, the offset in the x direction between the edge of the document plane 28 and alignment point P1 is $x'_{P1D}$, and the offset between the left edge of the skew corrected camera plane 18 and alignment point P1 is $x'_{P1}$. Thus, it can be seen that the offset between the left edge of the document plane 28 and the left edge of the skew corrected camera plane 18 is given by $$x'_{P1S} = x'_{P1} - x'_{P1D}. \quad (5)$$

Similarly, in the y direction, the offset between the upper edge of document plane 28 and the upper edge of skew corrected camera plane 18 is given by $$y'_{P1S} = y'_{P1} - y'_{P1D}. \quad (6)$$

Equations (5) and (6) allow alignment point P1 to be referenced to the edges of the document plane 28.

Now that the alignment point P1 has been referenced to the edges of the document plane 28, it is necessary to reference any generalized point Pn on the document to be digitized to the edges of document plane 28 by computing the distance $x_{Pn}''''$ and $y_{Pn}''''$ shown in FIG. 5D. From FIG. 5D, it can be seen that $$x_{Pn}'''' = x_{Pn}''' + x'_{P1D} \quad (7)$$

and $$y_{Pn}'''' = y_{Pn}''' + y'_{P1D} \quad (8)$$

where
- $x_{Pn}'''$ is the distance in the x direction between document point Pn and alignment point P1;
- $y_{Pn}'''$ is the distance in the y direction between document point Pn and alignment point P1;
- $x'_{P1D}$ is the distance in the x direction between the left edge of document plane 28 and alignment point P1; and
- $y'_{P1D}$ is the distance in the y direction between the upper edge of document plane 28 and alignment point P1.

Figure 5E:
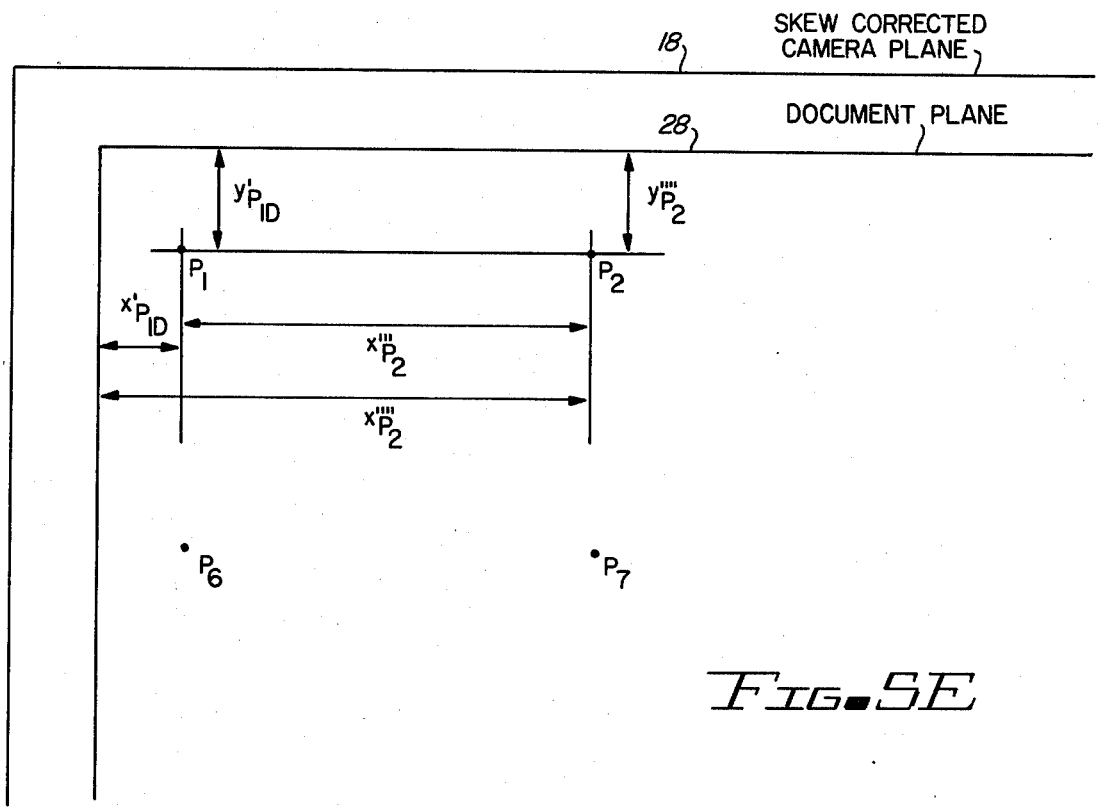

Likewise, the location of alignment point P2 shown in FIG. 5E, relative to the edges of document plane 28, can be found in the same manner used for point Pn in FIG. 5D, in accordance with equations (7) and (8).

Figure 5F:
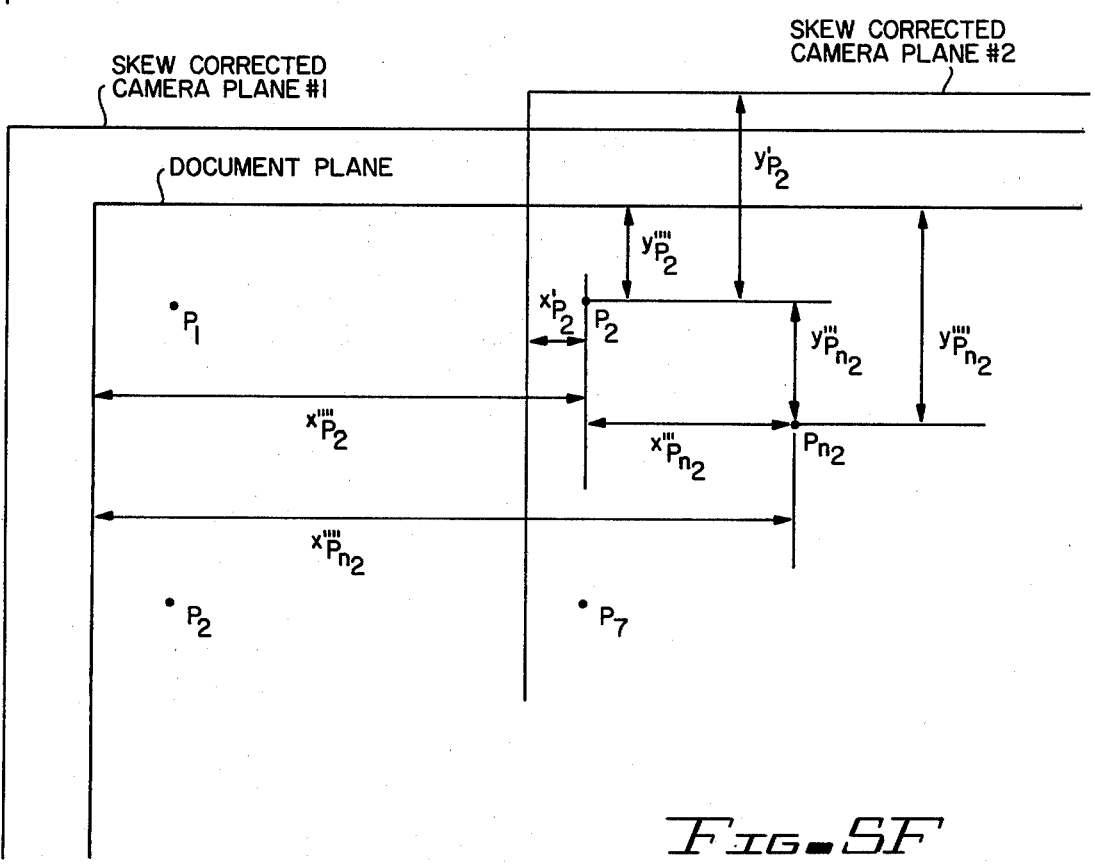

Now that the alignment point P2, which is in the field of view of both Camera No. 1 and Camera No. 2, has been referenced to the edges of document plane 28, it is now necessary to reference the coordinates of any generalized point Pn2 in the field of Camera No. 2 to the edges of document plane 28, as shown in FIG. 5F.

Referring now to FIG. 5F, $X_{Pn2}'''$ is the distance in the x direction between alignment point P2 and document point Pn2. This distance can be computed according to equation (3). Similarly, $y_{Pn2}'''$ in FIG. 5F can be computed according to equation (4). This enables us to reference the coordinates of Pn2 back to the edges of the document plane 28 by computing $$x_{Pn2}'''' = x_{P2}'''' + x_{Pn2}''' \quad (9)$$

and $$y_{Pn2}'''' = y_{P2}'''' + y_{Pn2}''' \quad (10)$$

where
- $x_{Pn2}''''$ is the x coordinate of document point Pn2 referenced to the left edge of document plane 28;
- $y_{Pn2}''''$ is the y coordinate of document point Pn2 referenced to the upper edge of document plane 28;
- $x_{P2}''''$ and $y_{P2}''''$ are the x and y coordinates, computed as explained above with reference to FIG. 5E, of alignment point P2, referenced to the edges of document plane 28;
- $x_{Pn2}'''$ and $y_{Pn2}'''$ are the skew corrected coordinates of Pn2 referenced to alignment P2 and computed, as mentioned above, in accordance with equations (3) and (4).

From the foregoing, it can be shown that for a generalized point Pnj in the field of view of the jth camera, the skew corrected, offset corrected coordinates referenced to the edges of the document plane 28, are $$x_{Pnj}'''' = x_{Pj}'''' + x_{Pj}''' \quad (11)$$

and $$y_{Pnj}'''' = y_{Pj}'''' + y_{Pj}''' \quad (12)$$

where
- $x_{Pj}''''$ is the skew corrected, offset corrected x coordinate, referenced to the left edge of document plane 28, of the upper left alignment point in the field of view of the jth camera computed in accordance with equation (7);
- $x_{Pnj}'''$ is the skew corrected distance in the x direction between the document point Pnj and the upper left alignment point in the field of view of the jth camera, computed in accordance with equation (3);
- $y_{Pj}''''$ is the skew corrected, offset corrected y coordinate, referenced to the upper edge of document plane 28 of the upper left alignment point in the field of view of the jth camera, and is computed in accordance with equation (8); and
- $y_{Pnj}'''$ is the skew corrected distance in the y direction between the document point Pnj and the upper left alignment point in the field of view of the jth camera, computed in accordance with equation (4).

Figure 3A:
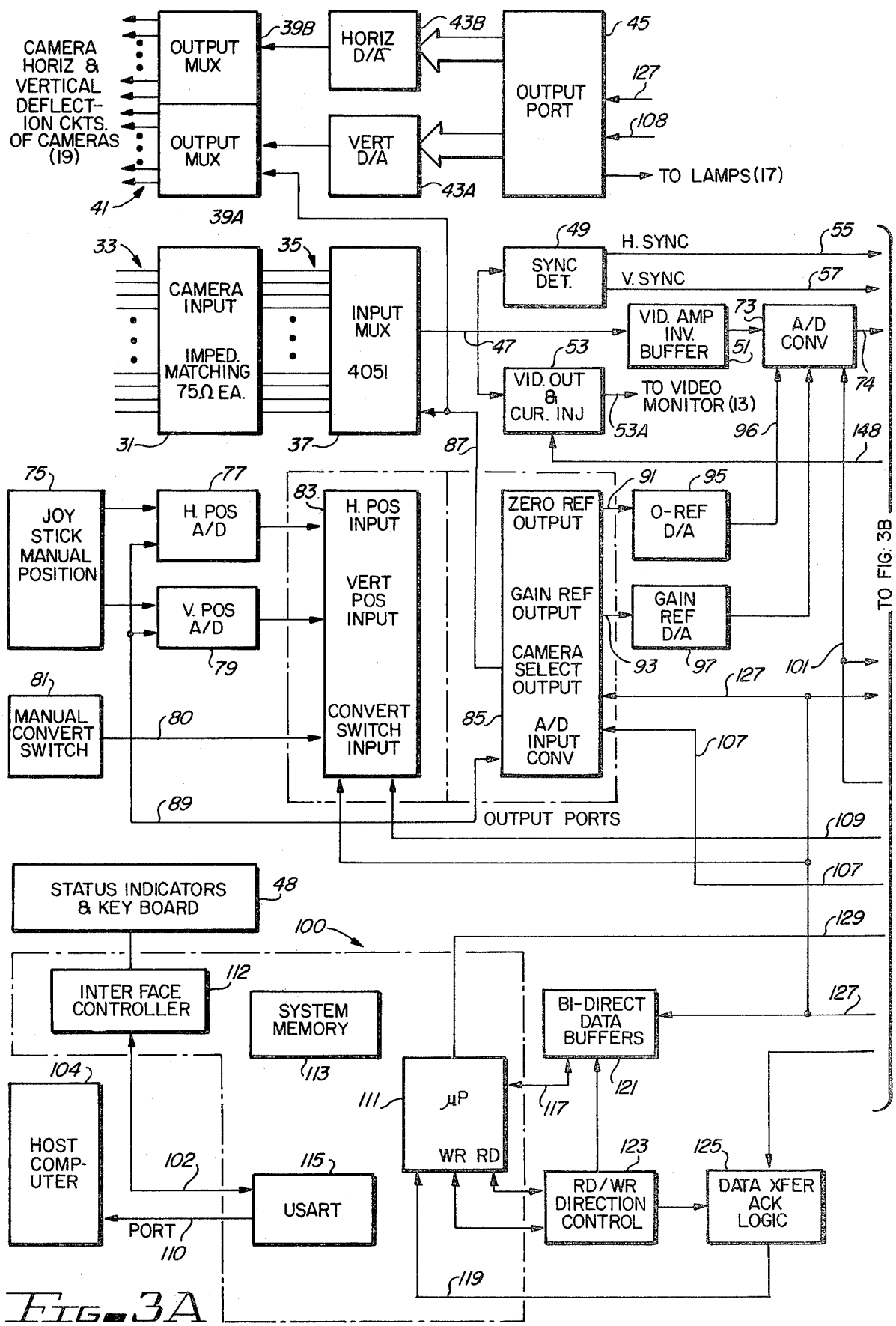
FIGS. 3A and 3B in combination constitute a detailed block diagram of the circuitry contained in the digitizer of FIG. 1.
Figure 3B:
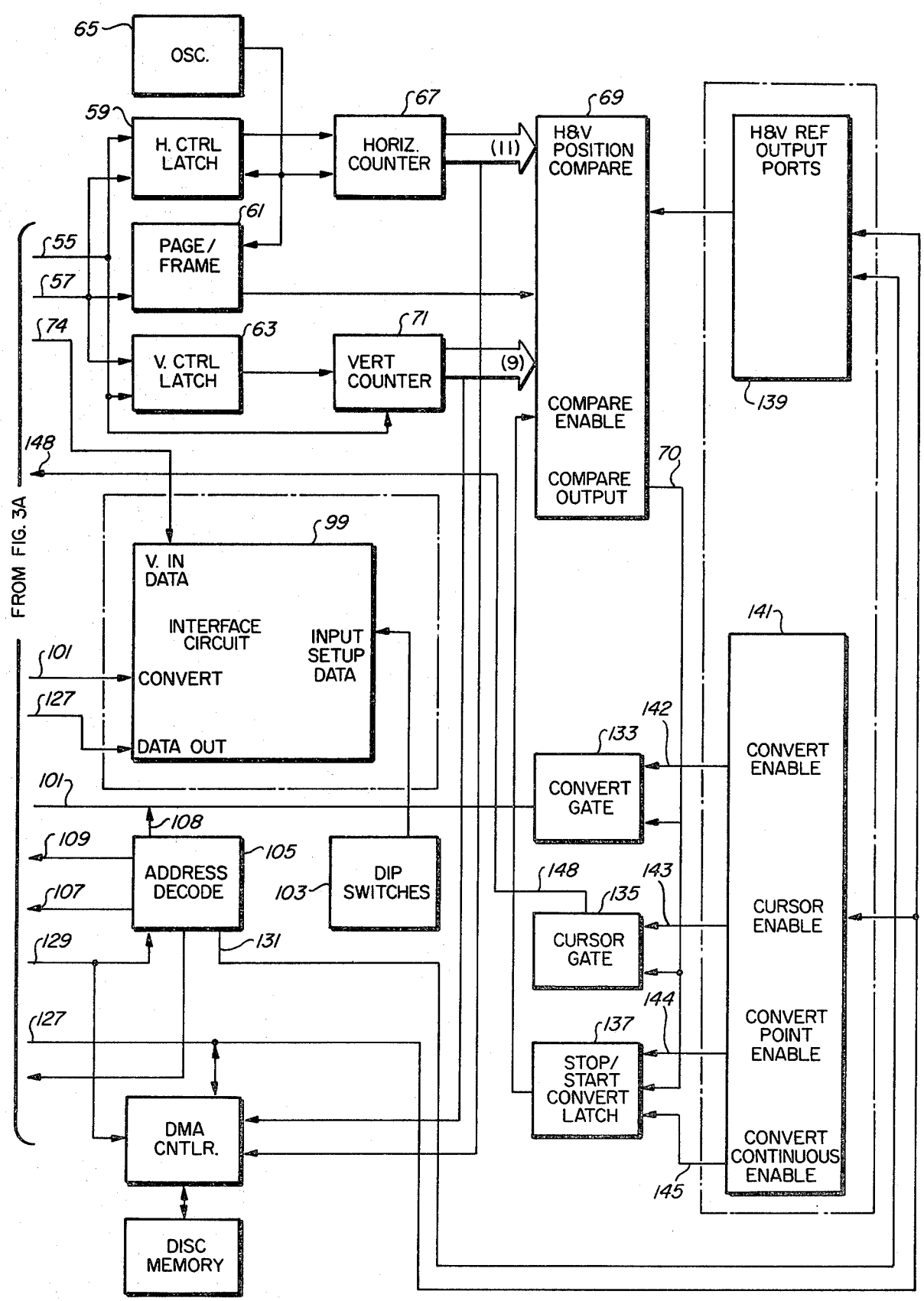

Turning now to FIGS. 3A and 3B, input multiplexer 37 selects which of cameras 19 is presently being controlled in response to the signal outputted on camera select bus 87 from output port 85. The input and output multiplexer circuitry in blocks 37, 39A, and 39B can be implemented by means of RCA 4051 CMOS integrated circuit multiplexers.

Assuming that the video cameras 19 (FIG. 1) generate "composite" output signals (which include video brightness data and also horizontal and vertical synchronization data), it is necessary to separate the horizontal and vertical "sync" pulses from the video data. Therefore, output 47 of multiplexer circuit 37 is coupled to inputs of sync detect circuitry 49, video amplifier circuitry 51, and cursor injection circuitry 53, subsequently explained. Sync detect circuit 49, which can be implemented by means of the circuitry shown in FIG. 6, generates the horizontal synchronization signal on conductor 55 and the vertical synchronization signal on conductor 57. Sync detection circuit 49 performs the function of "stripping" the sync pulse information from the composite video signal on conductor 47. Conductor 57 is connected to inputs of horizontal control latch circuit 59, page/frame detect circuit 61, and vertical control latch 63. Page/frame detector 61 indicates whether odd or even lines are being detected from the active camera and "painted" on the CRT monitor 13 of FIG. 1. Information in horizontal control latch 59 is used to trigger horizontal counter circuit 67, which begins counting at the beginning of "painting" of each horizontal line of the monitor screen. Horizontal counter 67 counts to 1,024 and can be implemented by means of Texas Instruments 74LS161 counters. Information in vertical control latch 63 is used to increment vertical counter 71, which also may be implemented by means of 74LS161 counters. Vertical counter 71 counts to 512. The counter output information from counters 67 and 71 is fed into digital comparator circuit 69, which can be implemented by means of Texas Instruments 74LS85 digital comparator integrated circuits. The "real time" count indicating the horizontal position of the video input source (i.e., the camera scan position) is compared to a digital number representing the "desired" horizontal position selected for digitizing either by means of joystick 75, keyboard 48 or microprocessor 111. This digital number is received from microprocessor 111 by bidirectional data buffer circuitry 121 and outputted therefrom to output port circuitry 139, and then from output port circuitry 139 to the inputs of digital comparator circuitry 69 that correspond, respectively, to the eleven outputs of horizontal counter 67. Similarly, the real time count (indicating the vertical position on a page of the video camera scan position) contained in the nine bits of vertical counter 71 is compared to the vertical video input representing a desired position preselected for digitizing and outputted from microprocessor 111 through buffers 121 to output port 139. That number is applied via output port 139 to the nine inputs of digital comparator circuitry 69 that correspond, respectively, to inputs connected to the nine outputs of vertical counter 71.

When the contents of horizontal counter 67 or vertical counter 71 match the horizontal or vertical "reference" numbers inputted to comparator 69 from output port circuitry 139, a "compare" output signal is produced by comparator circuitry 69 on conductor 70. This compare signal is applied as an input to stop/start conversion latch 137, to cursor gate 135, and to one input of convert gate 133. A "convert enable" signal is applied by means of conductor 142 to another input of convert gate 133 to cause a "convert" command to be applied to a "convert" input of analog to digital converter 73 when directed by microprocessor 111 and digital comparator 69. Analog-to-digital converter 73 can be implemented by means of a TRW TDC1014 six-bit analog-to-digital converter. The command signal initiates conversion of the amplified video output signal produced by video amplifier circuit 51 to a digital number. Video amplifier circuit 51 can be implemented by means of the circuit shown in FIG. 7.

The position comparator circuit 69 causes an analog-to-digital conversion when the camera scan has reached the exact X and Y coordinates of the pixel that has been selected either by means of joystock 75 or the stored program executed by microprocessor 111.

Output port circuit 141 can receive a convert enable signal, a cursor enable signal, a convert point enable signal, and a convert continuous enable signal from microprocessor 111. These signals are produced on conductors 142, 143, 144, and 145. Conductor 143 is connected to one input of cursor gate 135. Conductors 144 and 145 are connected to respective inputs of stop/-start convert latch 137.

Cursor gate 135 produces a signal on conductor 148 that enables injection of a cursor signal, subsequently explained, into the video output amplifier when cursor gate 135 is enabled by a horizontal and vertical position comparator output level on conductor 70 and the microprocessor output port "cursor enable" signal is present on conductor 143. Cursor injection circuit 53 can be implemented by means of circuitry included in the diagram of FIG. 6. The output of cursor gate 135 and cursor injection circuit 53 cooperate to allow the above-mentioned cursor to be displayed on the screen of monitor 13 (FIG. 1) at the selected position represented by the horizontal and vertical reference signals outputted by port 139. Stop/start latch circuit 137 produces an output signal that is applied to a "compare enable" input of digital comparator circuit 69 for the purpose of allowing microprocessor control of when a conversion will be allowed. The information stored in horizontal control latch 59 enables the digitizer system of FIGS. 3A and 3B to synchronize the starting of horizontal counter 67 with the horizontal sync pulse information produced by the presently selected camera. Vertical control latch 63 performs a similar function with respect to vertical counter 71. The output of analog to digital converter 73 is a digital representation of that brightness.

The digital information produced by analog to digital converter 73 is conducted by conductor 74 to an input port 99, which can be implemented by means of circuitry included on an Intel Semiconductor 8255 interface integrated circuit. From there, it can be loaded into system memory 113 or it can be outputted directly to a host computer 104.

Joystick 75 is a manual positioning device that can be implemented by means of any of numerous commercially available devices that can perform the function of continuously moving the cursor anywhere within the field of view shown on the CRT screen of monitor 13 (FIG. 1). A keyboard included in block 48 of FIG. 3A can be used to manually select which camera the displayed image will correspond to. The keyboard also can be used to effectuate digitizing of the point to which the cursor has been manually positioned by means of joystick 75. Joystick 75 produces "horizontal" and "vertical" analog signals that are provided as inputs to analog-to-digital converters 77 and 79 to produce digital numbers that are provided as inputs to the vertical position inputs and horizontal position inputs of input port circuit 83. Input port circuit 83 can be implemented by means of circuitry included in the above mentioned Intel Semiconductor 8255 interface integrated circuit as can output port circuits 45, 85, 139, 141 and circuit 99. Analog-to-digital converters 77 and 79 can be implemented by Intersil ICL7109 twelve bit analog-to-digital converters.

Manual convert switch 81 is simply a pushbutton switch that is used to effect digitizing the point of the document on digitizing surface 5', as displayed on CRT monitor 13, wherein the cursor has been positioned by means of joystick 75. The user simply presses button 81 after the cursor has been moved to the desired position on the displayed document image in the field of view of the presently selected camera. The signal produced by manual convert switch 81 is applied to an input port of circuit 83 by means of conductor 80. It will be understood that all of the input and output ports shown in FIGS. 3A-3B are connected to microprocessor 111 by means of bidirectional data bus 127, which, in turn, is coupled by bidirectional data buffers 121 and interface data bus 117. All signals provided as inputs and outputs to the various ports of FIGS. 3A-3B are "read" or "written" by microprocessor 111 in accordance with the subsequently described program represented by the flowchart of FIGS. 4A-4G.

The digitizer system of FIGS. 3A and 3B performs automatic alignment functions on three levels. First, the system performs a "dark check" operation, wherein the internal light bars 17 (FIG. 1A) are turned off and the cover 11 is placed over the safety glass surface 5, without a document, to directly completely cover the glass surface 5, thereby producing the darkest possible level of light on the bottom surface of cover 11. Then, for each camera, microprocessor 111 causes the digitizer system to perform an analog-to-digital conversion of the video signal to obtain the digital numerical value of that video signal which corresponds to the darkest possible light level for each of the respective cameras 19. The program (subsequently described) executed by microprocessor 111 uses the darkest light level as seen by Camera No. 1 as a reference level. This level is converted to a digital reference number by digital-to-analog converter 73. As subsequently explained in detail, the "zero reference" input of digital-to-analog converter 73 is adjusted so that the level of light seen by each of the remaining 11 cameras causes that same digital reference number to be produced by analog to digital converter 73 as the remaining 11 cameras are sequentially selected. To this end, the light level readings obtained from analog to digital converter 73 are read by microprocessor 111 and compared to the reference level from Camera No. 1, and the error is applied to the inputs of digital-to-analog converter 95 (which can be implemented by means of a National Semiconductor 0808 digital-to-analog converter). Corresponding analog signals are produced on conductor 96 and thereby applied to the zero adjust input of analog-to-digital converter 73. The process is repeated until the digital "zero adjust" correction numbers are obtained and stored for each of the 12 video cameras 19.

After all of the digital zero reference numbers have been obtained and stored for each camera, the digitizer system performs a "light check" operation, wherein light bars 17 of FIG. 1 all are turned on, with cover 11 still covering glass surface 5, without a document, so that the white undersurface of cover 11 can be digitized to establish the brightest possible light level that can be seen by cameras 19. The microprocessor 111 then causes the video signal produced by the first camera to be again used as a reference, and obtains and stores "gain" correction numbers for the 12 cameras so that all 12 cameras cause the same maximum digital brightness number to be produced at the output of analog to digital converter 73.

The foregoing "dark check" and "light check" are part of the automatic initialization and alignment procedure executed by microprocessor 111, as subsequently described. As a result, each of cameras 19 produce the same codes for the darkest and lightest possible colors, respectively, scanned by the cameras. The difference between the lightest and darkest intensities is divided into 64 equal ranges. The "dark check" and "light check" operations ensure that each camera produces the same digital code for any particular light level.

An 8011 processor board 100 manufactured by National Semiconductor Company can be utilized to implement memory 113, USART (universal synchronous asynchronous receiver/transmitter) circuit 115, microprocessor 111 and interface controller 112. USART 115 is connected by means of bus 110 (of a typical RS232 input/output port) to a host computer 104. The 8011 processor board 100 has sockets for eight kilobytes of program memory and contains a National Semiconductor Company 8080 microprocessor integrated circuit. It is expected that a future version of the invention may utilize a Zylog 8001 computer board instead. A Texas Instruments 9996, 9995 or 99000 processor board could also be used. Microprocessor board 100 includes memory address decoding for random access memory and read only memory included within system memory block 113.

Read-write direction control logic 123 controls whether data is being outputted to or read from bus 127. Data transfer acknowledge logic 125 signals microprocessor 111 to "acknowledge" when information has been received on a designated input or output port.

Address decoder circuit 105, which can be implemented by a Texas Instrument 74LS138 address decoder integrated circuit, decodes logical address outputted by microprocessor 111 on address bus 129 to select which input or output port is to be read from or written into.

The input/output ports 45, 83, 85, 99, 139 and 141 are all implemented by means of an Intel Semiconductor 8255 interface integrated circuit.

Dual in line package (DIP) switches of block 103 are provided as inputs to I/O port 99 to set up the digitizer system of FIGS. 3A and 3B to operate at various baud rates, different numbers of data bits, different number of stop bits, and even or odd parity for USART 115 in order to facilitate communication with various host computers or other systems that might be connected to busses 102 and 110. This, of course, enables the digitizer system of FIGS. 3A and 3B to be conveniently reconfigured to whatever appropriate equipment the user might desire.

Figure 7:
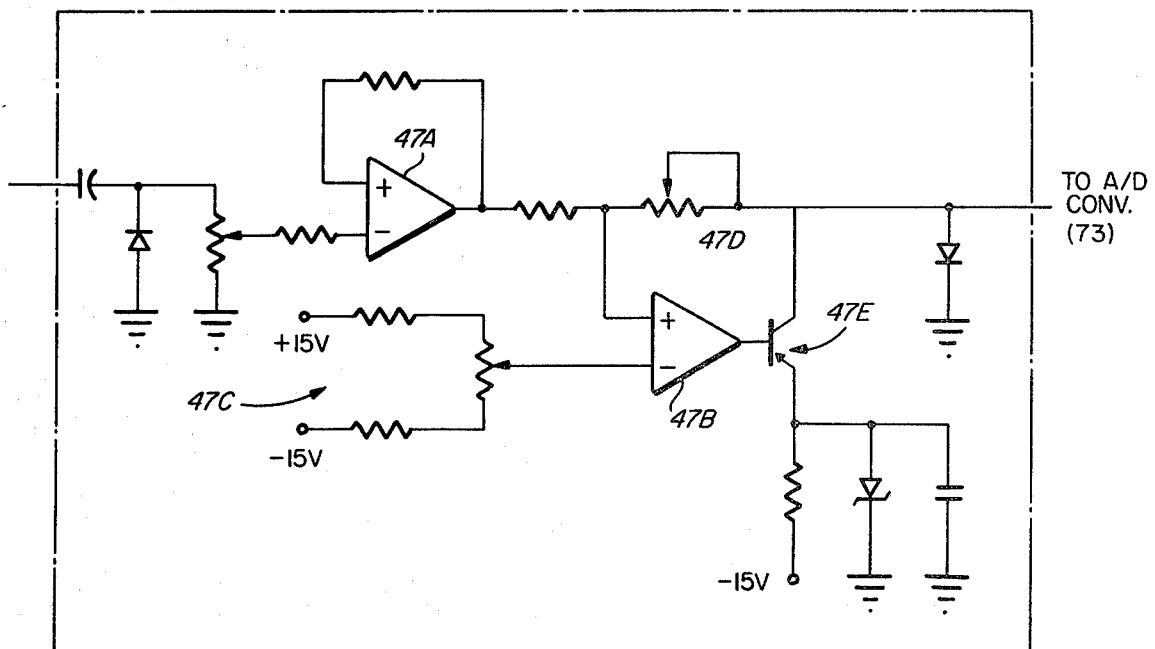
FIG. 7 is a schematic diagram of a video amplifier and inverting buffer circuit used in the circuit of FIGS. 3A and 3B.

The video amplifier and inverting buffer circuit 51 referred to above can be implemented by means of the circuit shown in FIG. 7, wherein the composite video signal on conductor 47 is applied to the input of an operational amplifier 47A, which can be implemented by means of a National Semiconductor LM318 integrated circuit. The amplified signal is applied to the input of circuitry including variable resistor 47D, operational amplifier 47B (also implemented by an LM318 integrated circuit), a resistor divider circuit 47C, and a transistor 47E. The later circuitry adjusts the offset of the amplified composite video signal so that it properly matches the analog input of analog-to-digital converter 73. Adjustable resistor 47D accomplishes adjustment of the video output level, and resistor circuitry 47C accomplishes adjustment of the DC offset of the output signal applied to the analog input of analog-to-digital converter 73.

Figure 6:
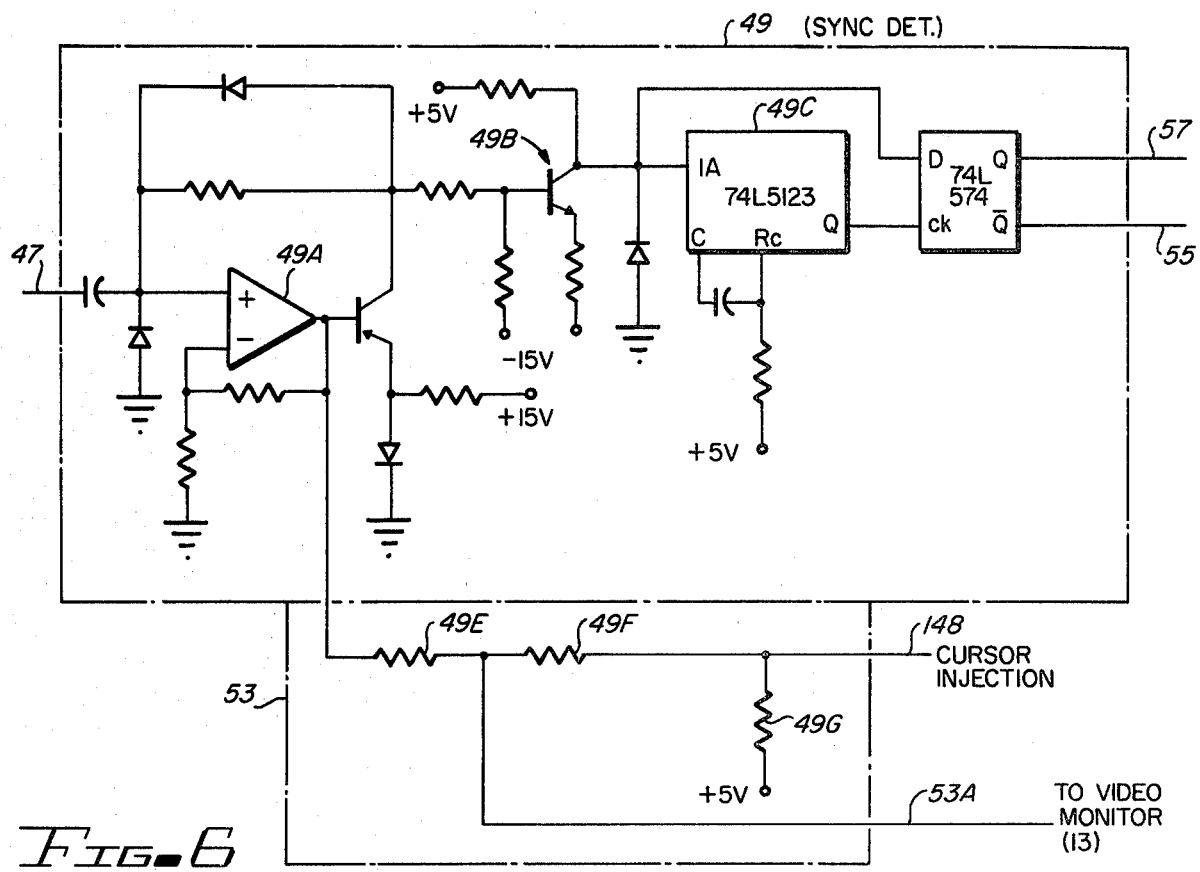
FIG. 6 is a schematic diagram of a sync detection, video output and cursor injection circuit used in the circuit of FIGS. 3A and 3B.

Referring now to FIG. 6, which discloses the sync detection, video output, and cursor injection circuits of block 53 in FIG. 3A, the composite video signal on conductor 47 is applied to the input of operational amplifier 49A (which is a National Semiconductor LM318 integrated circuit). This operational amplifier and the associated circuitry shown in FIG. 6 essentially "track" the sync signal portion of the composite video signal on conductor 47. The resulting signal is applied to circuitry including transistor 49B, which "squares" the resulting signal so that it is compatible with TTL circuitry. The resulting circuitry is applied to the input of a Texas Instruments 74LS123 one-shot circuit 49C and also the D input of a D flip-flop 49D. The outputs of one-shot 49C is applied to the clock input of flip-flop 49D are connected to conductors 57 and 55, respectively, of FIG. 3A, to provide the needed horizontal and vertical sync signals.

The cursor injection function is performed by resistors 49E, 49F and 49G, in conjunction with conductors 148 and 53A. The output of operational amplifier 49A is connected by resistor 49E to conductor 53A, which is connected to video monitor 13, and also to resistor 49F. Resistor 49F is connected to conductor 148, which conducts the previously mentioned cursor injection signal. Conductor 148 is connected by means of pull-up resistor 49G to a positive five volt supply voltage conductor.

Now that the basic operation and structure of the digitizer system of the present invention has been described indicating generally how skew and offset corrections are made to data automatically scanned by selected ones of cameras 19, the detailed operation of microprocessor 111 as it executes a program represented by the flow chart of FIGS. 4 and 4A–4G can be better understood. Any skilled programmer, given the flow chart of FIGS. 4 and 4A–4G and the logic diagram of FIGS. 3A and 3B, could write a program to cause microprocessor 111 to carry out the digitizing operations described herein.

More specifically, the operation of the microprocessor 111 to execute the program necessary to cause the digitizing system to perform the above mentioned "dark check" operation, "light check" operation, skew correction, and offset computation in FIGS. 4 and 4A–G. The overall operation includes execution of a conventional power-on routine, as indicated in block 201 of FIG. 4. The program then enters block 202 and executes an initialization routine. The program then enters block 203 and determines what operating mode has been selected by the operator by means of keyboard 48 (FIG. 3A).

The operating modes include (1) an "automatic mode" wherein the digitizer system automatically scans and digitizes the entire document, a selected automatic mode subset, a manual mode in which a particular point is manually selected by means of the joystick 75 and is digitized in response to depressing of manual convert switch 81, and a manual "continuous" mode wherein every point to which the cursor is moved on the document as displayed by monitor 13 is automatically digitized without use of manual switch 81. The program then enters block 204 and branches to one of the above routines, that effects execution of digitizing in the selected mode. Those skilled in the art can provide any of a wide variety of routines to effect selection of the various digitizing modes.

In FIG. 4A, the program enters block 210 and initializes the various input/output ports shown in FIGS. 3A–3B, turns on the power supply for the cameras, reads two sets of switches in block 103 (FIG. 3B) to determine how many cameras there are in the system along the horizontal x-axis and how many along the vertical y-axis.

The program then enters block 211, and causes a human digitizer operator to be signaled (by means of an indicator light) that execution of the above mentioned initialization routine is in progress.

Next, the program enters decision block 213 and tests a flag to determine whether cover 11 (FIG. 1) is closed. If it is not, the program causes a signal to be provided to alert the digitizer operator to close cover 11 without a document on digitizing surface 5, as indicated in block 212. The program continues to loop back through decision block 213 until the operator closes cover 11. Then, the program enters decision block 214 and tests a flag to determine if a warm-up time delay has elapsed. When it has elapsed, the program then goes to block 215 and computes the number of cameras in the system by multiplying the above-mentioned numbers of cameras that were determined in block 210 to be along the x and y axis, respectively. This number is then stored in memory 113 (FIG. 3A), as indicated in block 216. The program then goes to block 218 of FIG. 4B via label 217.

In block 218, the program initializes a software counter CAMCTR that keeps track of which camera is presently selected during the digitizing process. The value of the camera counter is initially set to 1. A function counter is also initialized to 0 in block 218. The function counter keeps track of which function is presently being carried out by the digitizer system of FIGS. 3A and 3B. The function numbers that are assigned to be represented by the function counter values of 0, 1, 2, and 3 are, respectively, the dark check, light check, skew check, and offset check functions, subsequently described. The program also initializes a function table pointer that points to the next location of memory 113 in which the next digitized result from analog to digital converter 73 is to be stored.

The program then goes to block 219 and "selects", i.e., enables Camera No. 1. This causes input multiplexer 37 of FIG. 3A to route the previously described camera composite video signals received from the selected camera to conductor 47.

The program then enters block 220 and "calls" the present function to be executed for Camera No. 1. Since the function counter initially has been set to zero, the program now calls and executes the routine that effects execution of the dark check function. This routine is subsequently explained in detail with reference to FIG. 4C. After the dark check function of FIG. 4C has been completed for Camera No. 0, the program returns from that routine to block 220 and then goes to block 221.

In block 221, the program disables the presently enabled camera, which on the first pass will be Camera No. 1, and goes to decision block 222 and tests the above mentioned camera counter CAMCTR to determine if the presently selected camera is the last camera (i.e., Camera No. 12). If this is not the case, the program goes to block 231 and increments the camera counter and the function table pointer previously referred to in block 218. (The function table pointer is a memory pointer that points to the next block of memory in which the results obtained from scanning by the presently selected camera is to be stored.) The program then enters block 232 and selects the next camera, which on the second pass would be Camera No. 2. The program then calls the appropriate routine, which would be the dark check subroutine of FIG. 4C if the function counter has not yet been incremented, i.e., if the dark check function has not been performed for all cameras in the system.

Figure 4B:
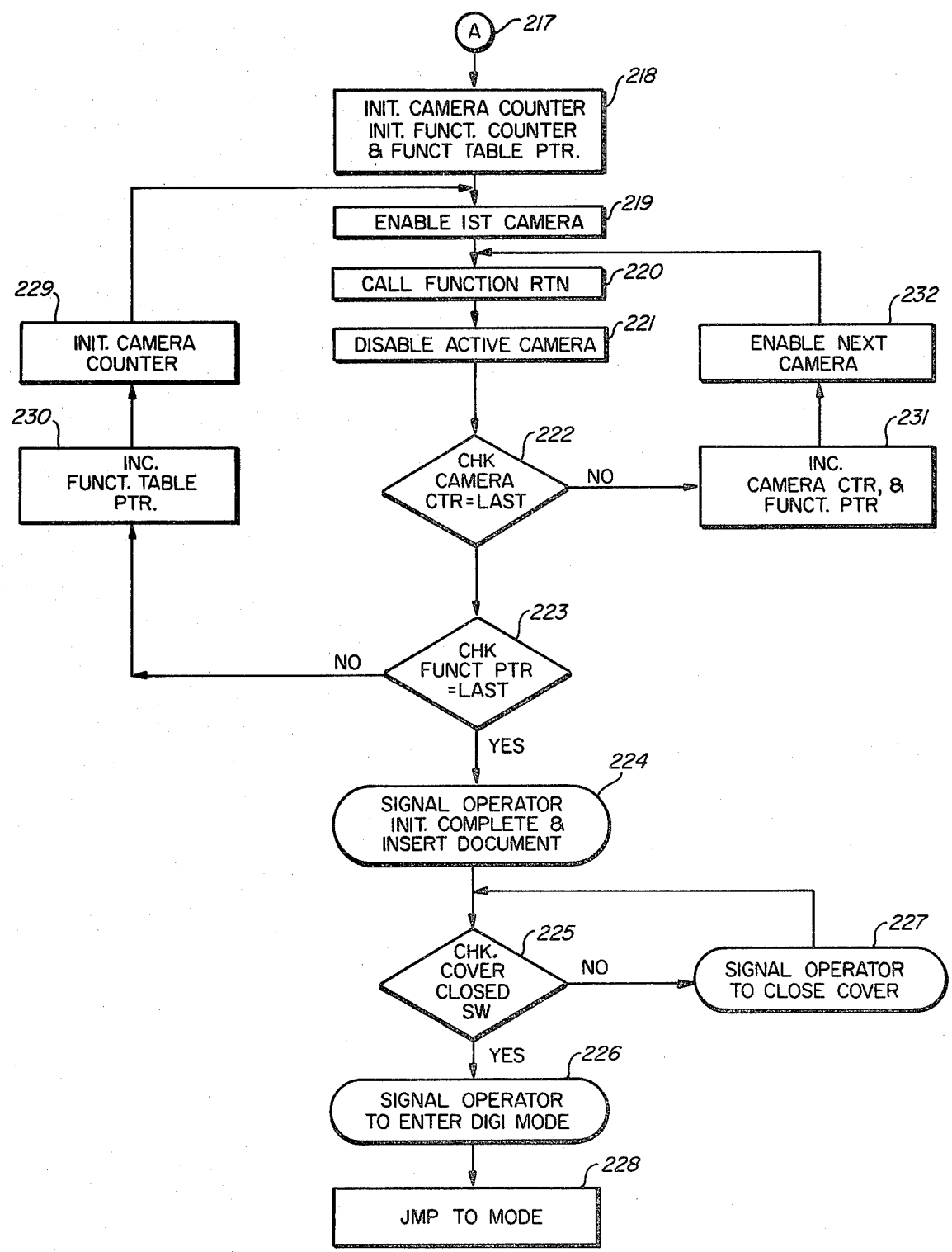

If it is determined in decision block 222 that the present camera is Camera No. 12, so that the dark check function has been performed for all of cameras 19, the program goes to decision block 223 and checks to determine if the function pointer is equal to the number of the last function to be performed, i.e., 3. If not, the program then goes to block 230 and increments the function table pointer. If the last function performed was the dark check, the program then increments the contents of the function table pointer to the value 1, so that the light check routine will be executed for all 12 of cameras 19. The program then goes to block 229 and initializes the camera counter back to 1 again. The program then enters block 219, selects Camera No. 1, and repeats the previously described sequence, except that this time the light function routine of FIG. 4D is called for all 12 cameras. After the foregoing sequence has been repeated for all four of the above-mentioned functions for all of the 12 cameras, the decision made in decision block 223 will be to go to block 224.

In block 224, the program causes the digitizer system to signal the operator, most likely by means of an indicator light, that the initialization of the digitizer system has been completed, so that the operator should insert a document to be digitized face down on digitizing surface 5' between plate 5 and the bottom surface of cover 11 (FIG. 1). Next, the program goes to decision block 225 and checks the status of a cover switch (not shown) to determine if cover 11 is closed. If it is not, the program enters block 227 and causes a signal to be generated, by means of a signal light or buzzer, to close cover 11, and continues to loop through decision block 225 and block 227 until the operator closes cover 11. If the determination of decision block 226 is affirmative, the program goes to block 225 and signals the operator, again by means of an indicator light, to push a key that causes the digitizer to enter a digitizing mode selected by means of keyboard 48 (FIG. 3A). The program then goes to block 228 and jumps to block 203 of FIG. 4.

In block 228 the program signals the operator to enter the desired digitizing mode into the digitizer via keyboard 48.

The flow charts of each of the functions numbered 0 through 3 executed in the initialization routine are shown in FIGS. 4C through 4G. The dark check function, designated as function 0, is performed by the subroutine of FIG. 4C, and is entered in block 234. In block 234, the program sets the horizontal and vertical comparator inputs to digital comparator 69 and the inputs to zero reference digital to analog converter 95 (FIG. 3A) to their mid range values. This causes the dark check function to be performed on a portion of the digitizing surface to be performed on a portion of the digitizing surface 5' that is close to the geometrical center of the field of view of the camera presently pointed to by the above mentioned camera conter. The above mentioned setting of zero reference digital to analog converter 95 to its mid-range value allows subsequent upward and downward adjustments of the zero reference input of analog-to-digital converter 73.

The program then goes to block 235 and calls a "convert" routine that simply causes digital comparator 69 to output the above mentioned convert command on conductor 101 to analog-to-digital converter 73 when the spot that the present camera is scanning has coordinates that are equal to the horizontal and vertical values that were selected in accordance with block 234. This will cause the brightness level at the selected mid-range position to be digitized. The convert routine also stores the result of that digitizing operation in memory 113. When the program completes execution of the convert routine, it enters decision block 236.

In decision block 236, the program compares the converted output, i.e., the previously digitized brightness level, with a zero reference constant, that was obtained during the initialization operation in block 210 of FIG. 4A. If the converted video output brightness is greater than a predetermined zero reference constant, the program goes to block 241 and decrements the zero reference digital-to-analog converter 95. The program then reenters block 235 and calls the convert routine again and digitizes a new value of brightness. The program then again enters decision block 236 and compares the digitized video signal brightness level with the zero reference constant. If the converted output is less than the zero reference number, the program enters block 240 and increments zero reference digital-to-analog converter 95. In either case, the offset analog input to analog-to-digital converter 73 is successively increased or decreased until zero reference digital-to-analog converter 95 is adjusted so that the digitized brightness is equal to the predetermined zero reference number. At this point, the program goes from decision block 236 to block 237. The present zero reference setting of digital-to-analog converter 73 now is the one that will represent a brightness of zero on a document subsequently being digitized. This setting is stored in memory 113, in accordance with block 237, for future use.

Next, the program goes to block 238 and increments the memory address so that it will have the correct value to accept the next zero reference digital-to-analog setting for the next camera selected for the dark check function. The program then returns to block 220 of FIG. 4B via label 239.

The light check routine corresponding to function No. 1 is shown by the flow chart of FIG. 4D. The routine of FIG. 4D is entered at block 242, wherein microprocessor 111 generates a signal that turns on all of light bars 17 of FIG. 1A. This produces the brightest light that will be seen under any circumstances by the cameras 19. The program then goes to block 243, and causes the microprocessor 111 to set the horizontal and vertical reference inputs to comparator 69 to values that represent the mid-portion of the field of view of the presently selected camera, and also sets input of gain reference digital to analog converter 97 to a mid-range value. The program then goes to block 244 and fetches the previously determined zero reference number of the presently active camera from memory 113 and inputs it to zero reference ditital-to-analog converter 95.

Figure 4C:
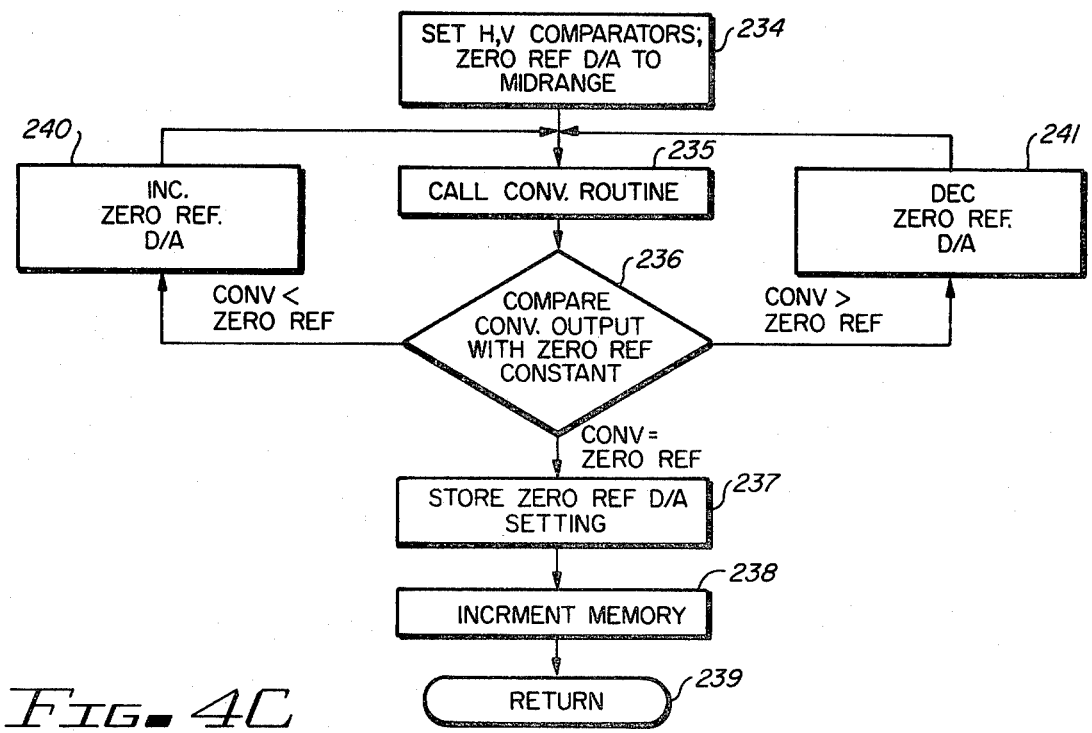
Figure 4D:
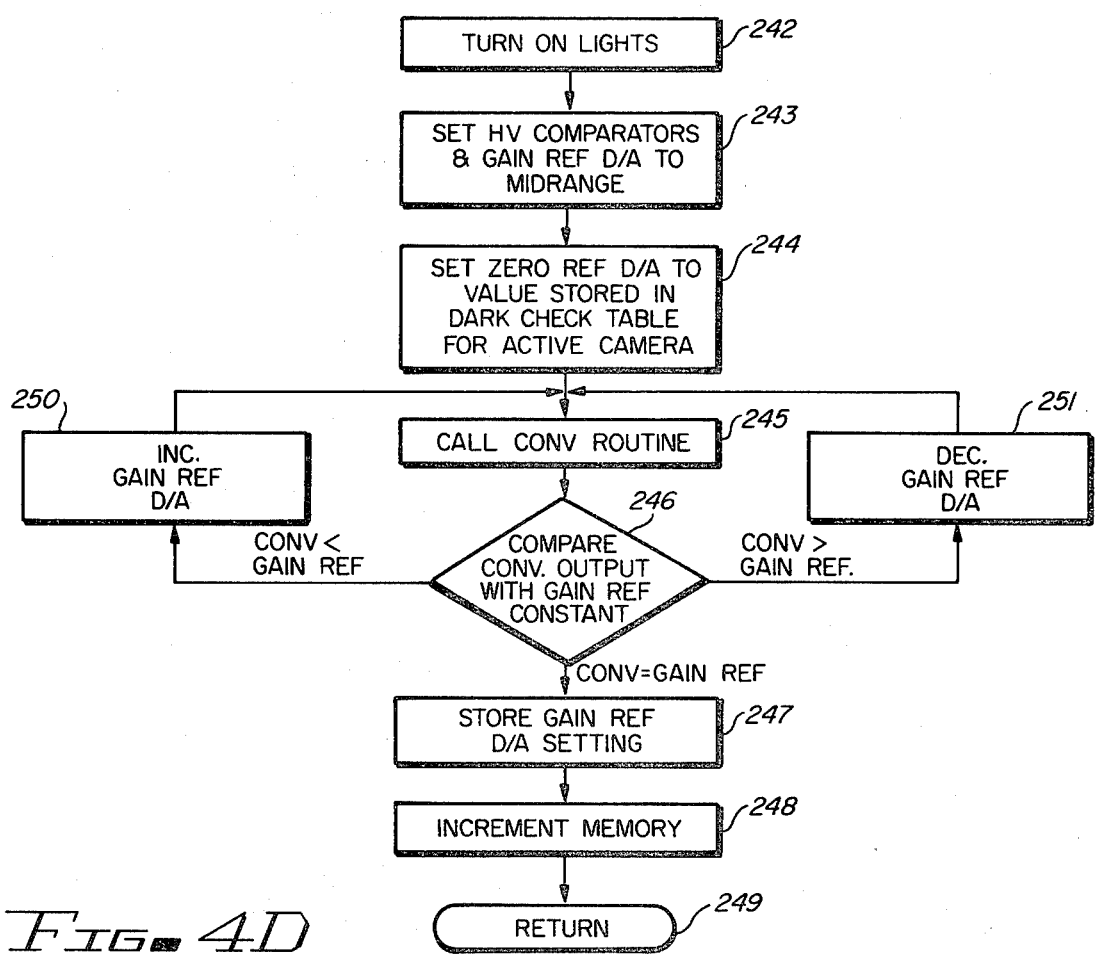

The program then enters block 245, and executes the convert routine previously referred to in block 235 of FIG. 4C. The program then enters decision block 246 and compares the resulting digitized brightness level with a gain reference constant that has been previously established as the digital code representing the brightest light intensity that any of the cameras ever see while digitizing a white document. If the digitized brightness level is greater than the gain reference constant, the program goes to block 251 and decrements gain reference digital to analog converter 97. The program then re-enters block 245, digitizes the brightness level of the video output of the selected camera, again performs the comparison indicated in block 246, and continues executing this loop until the digitized number is equal to the predetermined gain reference constant. However, if it is determined in block 246 that a digitized brightness level is less than the gain reference constant, the program goes to block 250, and increments the gain reference input of digital-to-analog converter 97 and re-enters block 245 and continues executing that loop until the digitized brightness level is equal to the gain reference constant.

When the digitized brightness level is finally equal to the gain reference constant, the program goes from decision block 246 to block 247 and stores the present setting of the digital inputs of gain reference digital-to-analog converter 97 in memory 113. The program then goes to block 248 and increments the memory address so that it points to the next available memory location to facilitate storing of the next gain reference digital-to-analog converter setting needed for the next selected camera on which the light check function routine is performed. The program then returns to the portion of the program from which the light check function routine was called, namely block 220 of FIG. 4B.

Figure 4E:
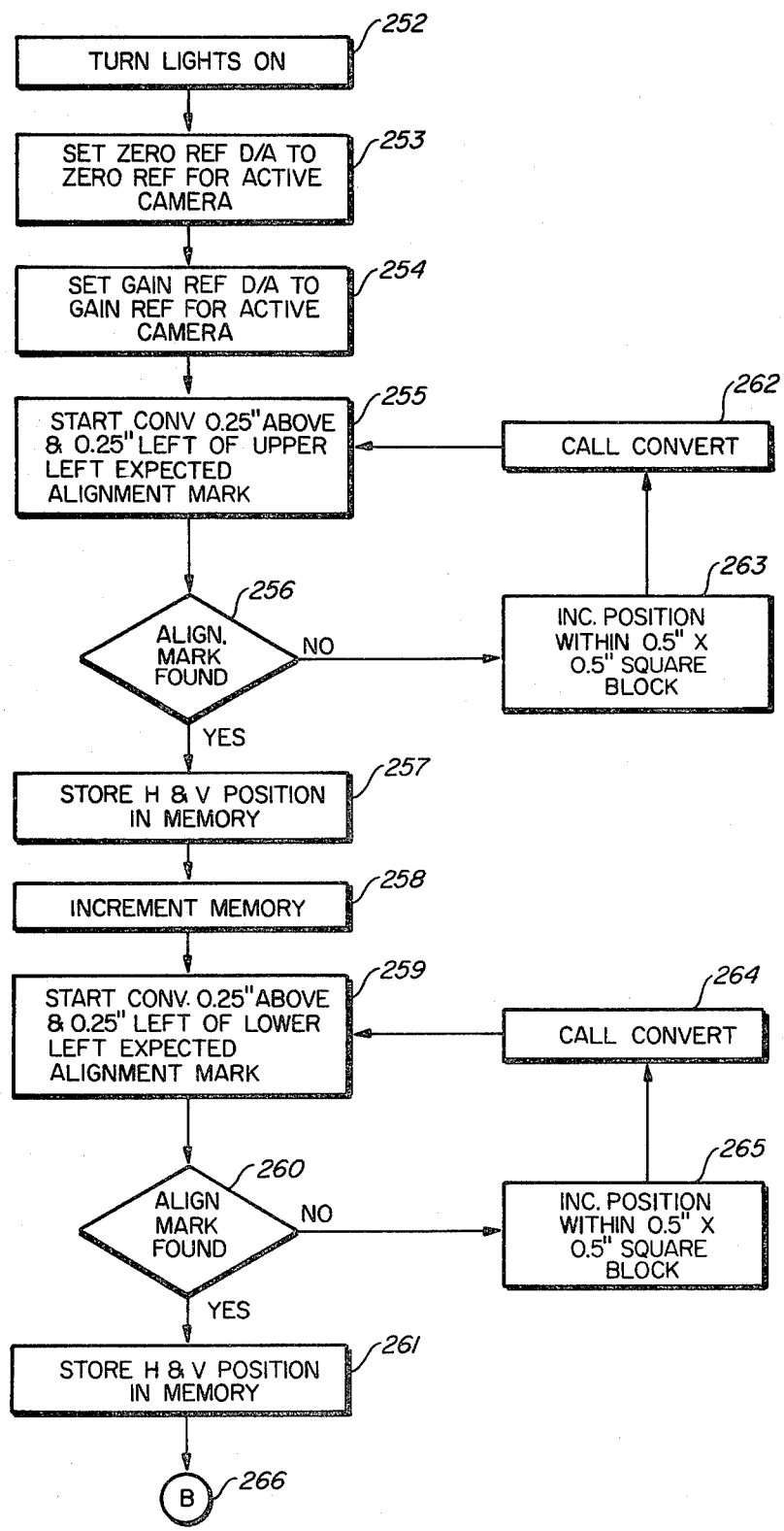

The skew check operation designated function No. 2, is performed by means of the program represented by the flow chart of FIGS. 4E and 4F. This routine is entered at block 252, wherein microprocessor 111 causes light bars 17 of FIG. 1 to be turned on. Light bars 17 must be on because this routine must illuminate the previously mentioned alignment marks on the bottom of the cover. The program then goes to block 253 and causes microprocessor 111 to fetch the zero reference digital-to-analog converter setting previously obtained for the camera presently pointed to by the software camera counter to the zero reference output bus 91 of output port 85 and apply that setting to the inputs of zero reference digital-to-analog converter 95. The program then goes to block 254 and fetches the gain reference digital-to-analog converter setting previously obtained for the camera presently pointed to by the software camera counter and then outputs that gain reference setting to digital-to-analog converter 97.

In block 255, microprocessor 111 executes a simple routine that starts scanning locations approximately ¼ inch above and to the left of the expected position of one of the alignment marks P1–P20 (FIG. 2) in the field of view of the presently selected camera.

Note that the alignment mark referred to in block 255 is point A in FIG. 5B and the alignment point referred to in block 259 of FIG. 4E is point B of FIG. 5B. Note also that $y_B$ is the vertical coordinate of point B of FIG. 5B and $y_A$ is the vertical coordinate of point A of FIG. 5B.

Next, the program goes to decision block 256 and determines if the coordinates of the subject alignment mark, as seen by the camera presently pointed to by the camera counter, have been found. If not, the program goes to block 263, increments the position to be next scanned, within a half inch square block within which the present alignment mark is expected to be. The program then enters block 262, calls the previously mentioned convert routine, and digitizes the brightness of the spot on cover 11 presently being scanned by the selected camera. The program then re-enters decision block 256 and continues execution of the loop including blocks 256, 263, 262 and 255, scanning successive points within the half inch square block until the coordinates of the subject alignment mark are found. The program then goes to block 257.

In block 257, the program writes the horizontal and vertical counts contained in horizontal counter 67 and vertical counter 71 into memory 113. At this point, the alignment mark has been found, and its coordinates, as seen by the selected camera, have been stored in memory 113.

The program then goes to block 258 and increments the memory address to point to the next available memory location and goes to block 259. Beginning in block 259, the program repeats a sequence of steps similar to those performed in blocks 255, 256, 263, and 262, except that the lower-left alignment mark within the field of view of the presently selected camera (rather than the upper left alignment mark) is the one for which the program is attempting to find horizontal and vertical coordinates. Again, microprocessor 111 causes the presently selected camera to begin scanning the upper left hand corner of a half inch square area within which the lower left alignment mark is expected to be found. After that alignment mark has been found, as determined in decision block 260, the program enters block 261, writes the horizontal and vertical positions represented by the contents of horizontal counter 67 and vertical counter 71 into memory 113 and increments the memory to its next available location. Next, the program goes to block 268 of FIG. 4F and calculates $$k = AB/(y_B - y_A).$$

AB is a known constant equal to the distance between permanent alignment point A and B on the bottom surface 11' of cover 11 (FIG. 1). k is the above-mentioned skew correction constant. The program then goes to block 269 and computes $x' = kx$ and $y' = ky$, where $x'$ and $y'$ are the skew corrected coordinates given by previously described equations (1) and (2). Next, the program goes to block 270 and stores the skew corrected constant k, and the skew corrected coordinates $x'$ and $y'$ of the point A.

Then the program goes to block 270A and computes $$\sin \psi = (x_A - x_B)/AB \text{ and}$$

$$\cos \psi = (y_B - y_A)/AB$$

Next, the program goes to block 270B and computes $x_{Pn}'''$, as given by equation (3), and $y_{Pn}'''$, as given by equation (4).

Then, the program goes to block 270C and stores the computed values of $\sin \psi$, $\cos \psi$, $x_{Pn}'''$ and $y_{Pn}'''$.

Then, the program goes to block 271, increments the memory address to point to the next location of memory, and returns to block 220 of FIG. 4B via label 272.

Figure 4G:
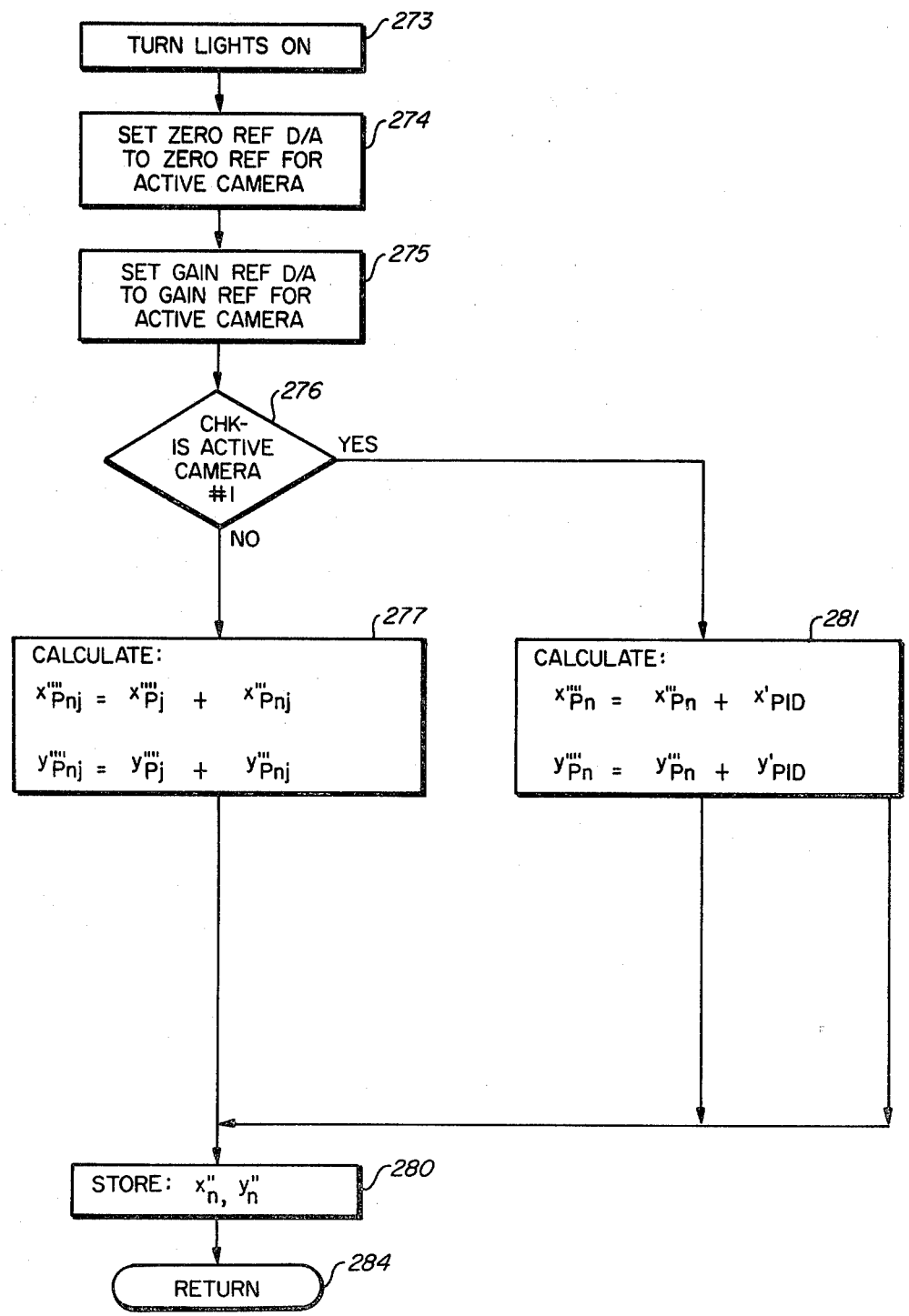

The previously mentioned offset check function routine, referred to above as function 3, is performed in accordance with the program flow chart shown in FIG. 4G, which is entered as block 273, wherein microprocessor 111 causes the light bars 17 to be turned on so the present camera can see the alignment marks P1–P20. The program then goes to block 274.

The purpose of the offset check routine of FIG. 4G is to correct coordinate data produced by each camera for skew and offset of each of the 12 cameras, so that continuous data across the entire digitizing surface 5' is produced by the cameras with no "discontinuities" in the data between adjacent ones of the areas P1, P2, P6, P7; P2, P3, P7, P8 etc. (FIG. 1) defined by the alignment points and dotted lines in FIG. 2.

In block 274 of FIG. 4G, the program loads the zero reference digital-to-analog converter setting previously stored for the presently selected camera from memory 113 into the zero reference output port 85, which inputs that setting to zero reference digital to analog converter 95. The program then goes to block 275 and fetches the gain reference digital-to-analog converter setting from memory 113 and loads it into the gain reference output port 93 of output port circuit 85, which applies that setting to the inputs of gain reference digital to analog converter 97. The program then goes to decision block 276 of FIG. 4G.

In decision block 276, the program determines if the presently selected camera is Camera No. 1. If it is, the program goes to block 281 to compute the offset $x_{Pn}''''$ and $y_{Pn}''''$, according to equations (7) and (8).

Once the skew and offset corrected "document" coordinates $x_{Pn}''''$ and $y_{Pn}''''$ have been computed for the present camera in accordance with block 281, the program goes to block 280 and stores those coordinates in memory 113. The program then returns to block 220 of FIG. 4B via label 284 of FIG. 4G.

If the determination in decision block 276 is negative, the program goes to block 277 to compute $x_{Pnj}''''$ and $y_{Pnj}''''$ in accordance with equations (11) and (12), respectively.

The program then stores the coordinates in memory 113, as indicated in block 280, and returns to the calling program, as indicated by label 284.

The above described automatic digitizer is a very high reliability digitizing device having the capability of digitizing in several modes, including complete automatic digitizing of an entire large document, automatic digitizing of selected parameters, manual digitizing of single points selected by means of the joystick, or manual continuous digitizing of all points traced out by the cursor on the document as displayed on the monitor as the cursor position is varied manually by means of the joystick. The degree of darkness of each point is digitized, allowing various shades of gray to be digitized. Large documents can be digitized automatically, without the need for an operator to position a cursor at each point to be digitized, greatly reducing the amount of operator time required for digitizing most documents. Inaccuracies caused by thermal expansion and contraction of the digitizing surface, pen tilt, operator fatigue, error caused inaccurate manual movement of a cursor along lines of various widths, and other errors associated with manual digitizers are completely avoided. The size of the digitizing surface can be increased in the horizontal and vertical directions without decreasing accuracy or resolution of the resulting digitizer system.

While the invention has been described with reference to a particular embodiment thereof, those skilled in the art will be able to make various modifications to the described digitizer system and method without departing from the true spirit and scope of the invention.

For example, the above described alignment marks may appear on the document to be digitized, rather than on the lower surface 11' of the cover 11. In this case, it would be necessary to ensure that the microprocessor is capable of distinguishing alignment marks from other marks on the document which is to be digitized. This distinguishing could be accomplished by using certain characters as alignment marks and providing subroutines that are capable of recognizing the alignment mark characters. Another means of distinguishing alignment characters from other marks to be digitized would be to distinguish them on the basis of degree of darkness. Although video cameras are the presently preferred means of image scanning, other image scanning devices could conceivably be used in accordance with the present invention. Although a transparent support plate for supporting the document or item to be digitized is shown in the disclosed embodiment of the invention, in some instances, the support plate would be unnecessary. For example, in some instances documents to be digitized could be hung, rather than supported by a plate, and the plate could be omitted.

We claim:

1. A method of digitizing an item, said method comprising the steps of:

(a) operating a first video camera to effect producing camera coordinates of first and second alignment points in the field of view of said first video camera and to effect producing a first plurality of camera coordinates of a third alignment point, said third alignment point also being in the field of view of a second video camera;

(b) operating said second video camera to effect producing a second group of camera coordinates of said third alignment point, and to effect producing camera coordinates of a fourth alignment point in the field of view of said second video camera;

(c) computing skew corrected coordinates of said first alignment point from said camera coordinates of said first and second alignment points, said skew corrected coordinates of said first alignment point being referenced to a boundary of a skew corrected camera plane of said first video camera;

(d) computing a first plurality of skew corrected coordinates of said third alignment point from said camera coordinates of said third alignment point and said skew corrected coordinates of said first alignment point, said skew corrected coordinates of said third alignment point being referenced to said first alignment point;

(e) computing skew corrected, offset corrected coordinates of said third alignment point from both said skew corrected coordinates of said third alignment point and an offset number representing the distance of a boundary of a document plane to the boundary of said skew corrected camera plane of said first video camera, said skew corrected, offset corrected coordinates of said third alignment point being referenced to the boundary of said document plane;

(f) computing a second plurality of skew corrected coordinates of said third alignment point from said second group of camera coordinates of said third alignment point and said camera coordinates of said fourth alignment point, said second plurality of skew corrected coordinates of said third alignment point being referenced to a boundary of a skew coorected plane of said second video camera;

(g) operating said second video camera to effect producing of camera coordinates of a general point in the field of view of said second video camera, said general point being a point of the item to be digitized;

(h) computing skew corrected coordinates of said general point from said camera coordinates of said general point and said second plurality of skew corrected coordinates of said third alignment point, said skew corrected coordinates of said general point being referenced to said third alignment point;

(i) computing skew corrected, offset corrected coordinates of said general point from said skew corrected coordinates of said general point and said skew corrected, offset corrected coordinates of said third alignment point, said skew corrected, offset corrected coordinates of said general point being referenced to said boundary of said document plane;

(j) outputting said skew corrected, offset corrected coordinates of said general point as a digitized value representing the location of said general point on said document.

2. The method of claim 1 wherein said first, second, third and fourth alignment points are disposed on a support surface that supports the item to be digitized and wherein said method includes placing the item to be digitized against the support surface between the support surface and said first and second video cameras after step (b) and before step (g).

3. The method of claim 2 wherein the item to be digitized is a document, the document covering said first, second, third and fourth alignment marks when the document is placed on the support surface.

4. The method of claim 3 including the method of storing said camera coordinates of said first, second, third and fourth alignment points.

5. The method of claim 4 wherein steps (c), (d), (e), (f), (h) and (i) are effectuated by operating a microprocessor system.

6. The method of claim 5 wherein steps (a), (b) and (g) are also effectuated by operating the microprocessor system.

7. The method of claim 1 wherein step (c) includes computing said skew corrected coordinates of said first alignment point in accordance with the formulas $$x'_A = kx_A \text{ and } y'_A = ky_A$$

wherein $x_A$ and $y_A$ are the camera coordinates of said first video camera for said first alignment point and k is the ratio of the distance between said first and second alignment points and the difference between a y camera coordinate of said second alignment point and a y camera coordinate of said first alignment point.

8. The method of claim 7 wherein step (d) includes computing said first plurality of skew corrected coordinates of said third alignment point in accordance with the formulas $$x_P''' = (x_P - x_A) \cos \psi + (y_P - y_A) \sin \psi$$

and $$y_P''' = -(x_P - x_A) \sin \psi + (y_P - y_A) \cos \psi$$

where $x_P$ and $y_P$ are the camera coordinates of said first video camera for said third alignment point, and $\psi$ is the angle by which said first video camera is skewed.

9. The method of claim 8 wherein step (e) includes computing said skew corrected, offset corrected coordinates of said third alignment point in accordance with the formulas $$x_P'''' = x_P''' + x_{PD}'$$

and $$y_P'''' = y_P''' + y_{PD}'$$

where
$x'_{PD}$ is an offset number representing the distance between an x boundary of said document plane and said first alignment point and $y'_{PD}$ is an offset number representing the distance between a y boundary of said document plane and said first alignment point.

10. The method of claim 9 wherein step (f) includes computing said second plurality of skew corrected coordinates of said third alignment point in accordance with the formulas $$x_P' = k_2 x_P \text{ and } y_P' = k_2 y_P$$

where
$x_{p'}$ and $y_P$ are camera coordinates of said second video camera for said third alignment point and
$k_2$ is the ratio between the distance between said third alignment point and a fourth alignment point and the difference between a y camera coordinate of said second video camera for said fourth alignment point and a y camera coordinate of said second video camera for said third alignment point.

11. The method of claim 10 wherein step (h) includes computing said skew corrected coordinates of said general point in accordance with the formulas $$x_G''' = (x_G - x_P) \cos \psi_2 + (y_G - y_P) \sin \psi_2 \text{ and}$$

$$y_G''' = -(x_G - x_P) \sin \psi_2 + (y_G - y_P) \cos \psi_2$$

where $x_G$ and $y_G$ are camera coordinates of said second video camera for said general point, and $\psi_2$ is the skew angle of said second video camera.

12. The method of claim 11 wherein step (i) includes computing said skew corrected, offset corrected coordinates of said general point in accordance with the formulas $$x_G'''' = x_G''' + x_{GD}'$$

$$y_G'''' = y_G''' + y_{GD}'$$

where $x_{GD}'$ is an offset number representing the distance between said x boundary of said document plane and said third alignment point and $y_{GD}'$ is an offset number representing the distance between said y boundary of said document plane and said third alignment point.

13. The method of claim 12 including repeating steps (g) through (i) for all other general points on said document in the field of view of said second video camera.

14. The method of claim 1 wherein said first, second, third and fourth alignment points are on the item to be digitized.

15. The method of claim 14 including the steps of producing codes to represent different degrees of darkness of points scanned by said first and second video cameras, said first, second, third and fourth alignment points having a degree of darkness that is recognized for the purposes of steps (a) (b), (c), (d), (e) and (g) but is not recognized for the purposes of steps (h) and (i) to cause digitizing of all general points on said document and avoid digitizing alignment marks.

16. The method of claim 1 wherein said first alignment point is located in the upper left corner portion of the field of view of said first video camera and said third alignment point is located in the upper left corner portion of said second video camera.

17. A system for digitizing an item, said digitizing comprising in combination:
(a) first and second video cameras;
(b) first means for operating a first video camera to effect producing camera coordinates of first and second alignment points in the field of view of said first video camera and to effect producing a first plurality of camera coordinates of a third alignment point, said third alignment point also being in the field of view of a second video camera;
(c) second means for operating said second video camera to effect producing a second group of camera coordinates of said third alignment point, and to effect producing camera coordinates of a fourth alignment point in the field of view of said second video camera;
(d) third means for computing skew corrected coordinates of said first alignment point from said camera coordinates of said first and second alignment points, said skew corrected coordinates of said first alignment point being referenced to a boundary of a skew corrected camera plane of said first video camera;
(e) fourth means for computing a first plurality of skew corrected coodinates of said third alignment point from said camera coordinates of said third alignment point and said skew corrected coordinates of said first alignment point, said skew corrected coordinates of said third alignment point being referenced to said first alignment point;
(f) fifth means for computing skew corrected, offset corrected coordinates of said third alignment point from both said skew corrected coordinates of said third alignment point and an offset number representing the distance of a boundary of a document plane to the boundary of said skew corrected camera plane of said first video camera, said skew corrected, offset corrected coordinates of said third alignment point being referenced to the boundary of said document plane;
(g) sixth means for computing a second plurality of skew corrected coordinates of said third alignment point from said second group of camera coordinates of said third alignment point and said camera coordinates of said fourth alignment point, said second plurality of skew corrected coordinates of said third alignment point being referenced to a boundary of a skew corrected plane of said second video camera;
(h) seventh means for operating said second video camera to effect producing of camera coordinates of a general point in the field of view of said second video camera;
(i) eighth means for computing skew coordinates of said general point from said camera coordinates of said general point and said second plurality of skew corrected coordinates of said third alignment point, said skew corrected coordinates of said general point being referenced to said third alignment point;
(j) ninth means for computing skew corrected, offset corrected coordinates of said general point from said skew corrected coordinates of said general point and said skew corrected, offset corrected coordinates of said third alignment point, said skew corrected, offset corrected coordinates of said general point being referenced to said boundary of said document plane; and
(k) means for outputting said skew corrected, offset corrected coordinates of said general point as a digitized value representing the location of said general point on said item to be digitized.

18. The digitizing system of claim 17 wherein said first, second, third and fourth alignment points are disposed on a support surface that supports the item to be digitized.

19. The digitizing system of claim 18 wherein the item to be digitized is a document, the document covering said first, second, third and fourth alignment marks when said document is placed on the support surface.

20. The digitizing system of claim 19 including means for storing said camera coordinates of said first, second, third and fourth alignment points.

21. The digitizing system of claim 20 wherein said third, fourth, fifth, sixth, eighth and ninth means are implemented by means of a microprocessor system.

22. The digitizing system of claim 21 wherein said first, second, and seventh means are implemented by means of said microprocessor system.

23. The digitizing system of claim 17 wherein said third means computes said skew corrected coordinates of said first alignment point in accordance with the formulas $$x'_A + kx_A \text{ and } y'_A = ky_A$$

wherein $x_A$ and $y_A$ are the camera coordinates of said first alignment point and k is the ratio of the distance between said first and second alignment points and the difference between a y camera coordinate of said second alignment point and a y camera coordinate of said first alignment point.

24. The digitizing system of claim 23 wherein said fourth means computes said first plurality of skew corrected coordinates of said third alignment point in accordance with the formulas $$x_P''' = (x_P - x_A)\cos\psi + (y_P - y_A)\sin\psi$$

$$y_P''' = -(x_P - x_A)\sin\psi + (y_P - y_A)\cos\psi$$

where $x_P$ and $y_P$ are the camera coordinates of said third alignment point, and $\psi$ is the angle by which said first video camera is skewed.

25. The digitizing system of claim 24 wherein said fifth means computes said skew corrected, offset corrected coordinates of said third alignment point in accordance with the formulas $$x_P'''' = x_P''' + x_{PD}'$$

and $$y_P'''' = y_P''' + y_{PD}'$$

where $x'_{PD}$ is an offset number representing the distance between a x boundary of said document plane and said first alignment point and $y'_{PD}$ is an offset number representing the distance between a y boundary of said document plane and said first alignment point.

26. The digitizing method of claim 25 wherein said sixth means computes said second plurality of skew corrected coordinates of said third alignment point in accordance with the formulas $$x_P' = k_2 x_P \text{ and } y_P' = k_2 y_P$$

where $x_P$, and $y_P$ are camera coordinates of said video camera for said third alignment point and $k_2$ is the ratio between the distance between said third alignment point and a fourth alignment point and the difference between a y camera coordinate of said second video camera for said fourth alignment point and a y camera coordinate of said second video camera for said third alignment point.

27. The digitizing system of claim 26 wherein said eighth means computes said skew corrected coordinates of said general point in accordance with the formulas $$x_G''' = (x_G - x_P) \cos \psi_2 + (y_G - x_P) \text{ sine } \psi_2 \text{ and}$$

$$y_G''' = -(x_G - x_P) \text{ sine } \psi_2 + (y_G - y_P) \cos \psi_2$$

where $x_G$ and $y_G$ are camera coordinates of said second video camera for said general point, and $\psi_2$ is the skew angle of said second video camera.

28. The digitizing system of claim 27 wherein said ninth means computes said skew corrected, offset corrected coordinates of said general point in accordance with the formulas $$x_G'''' = x_G''' + x_{GD}'$$

$$y_G'''' = y_G''' + y_{GD}'$$

where $x_{GD}'$ is an offset number representing the distance between said x boundary of said document plane and an x plane of said skew corrected plane of said second video camera and $y_{GD}'$ is an offset number representing the distance between said y boundary of said document plane and a y plane of said skew corrected plane of said second video camera.

29. The digitizing system of claim 17 wherein said first, second, third and fourth alignment points are on the item to be digitized.

30. The digitizing system of claim 29 including means for producing codes to represent different degrees of darkness of points scanned by said first and second video cameras, said first, second, third and fourth alignment points having a degree of darkness that is recognized by said first, second, third, fourth, sixth and seven means but is not recognized by said eighth and ninth means to cause said digitizing system to digitize all general points on said documents but to not digitize alignment points.

31. The digitizing system of claim 17 wherein said first alignment point is located in the upper left corner portion of the field of view of said first video camera and said third alignment point is located in the upper left corner portion of said second video camera.

32. The digitizing system of claim 17 including means for causing a reference surface to have a predetermined level of brightness, means for causing one of said video cameras to scan a first predetermined point of said reference surface, analog-to-digital conversion means for producing a reference code representing the brightness of said first predetermined point, means for storing said reference code, means for causing the other of said video cameras to scan a second predetermined point of said reference surface, means for causing said analog-to-digital conversion means to produce a brightness code representing the brightness of said second predetermined point, means for comparing said brightness code and said reference code, to produce adjustment information representing an amount of adjustment required to adjust said analog-to-digital conversion means to cause said analog-to-digital conversion means to produce a new value of said brightness code that is more nearly equal to said reference code, means for storing said adjustment information, and means for adjusting said analog-to-digital conversion means in response to said adjustment information.

* * * * *